(12) United States Patent
Wang et al.

(10) Patent No.: US 12,003,700 B2
(45) Date of Patent: Jun. 4, 2024

(54) REFERENCE PICTURE MANAGEMENT IN LAYERED VIDEO CODING

(71) Applicant: Huawei Technologies Co., Ltd., Guangdong (CN)

(72) Inventors: Ye-Kui Wang, San Diego, CA (US); FNU Hendry, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 192 days.

(21) Appl. No.: 17/536,621

(22) Filed: Nov. 29, 2021

(65) Prior Publication Data

US 2022/0086432 A1    Mar. 17, 2022

Related U.S. Application Data

(63) Continuation of application No. PCT/US2020/033595, filed on May 19, 2020.
(Continued)

(51) Int. Cl.
*H04N 19/105*    (2014.01)
*H04N 19/159*    (2014.01)
(Continued)

(52) U.S. Cl.
CPC ......... *H04N 19/105* (2014.11); *H04N 19/159* (2014.11); *H04N 19/172* (2014.11); *H04N 19/46* (2014.11)

(58) Field of Classification Search
None
See application file for complete search history.

(56) References Cited

U.S. PATENT DOCUMENTS

| | | |
|---|---|---|
| 2014/0086324 A1 | 3/2014 | Ramasubramonian et al. |
| 2015/0016519 A1* | 1/2015 | Xu .......................... H04N 19/70 375/240.12 |

(Continued)

FOREIGN PATENT DOCUMENTS

| | | |
|---|---|---|
| CN | 104662920 A | 5/2015 |
| JP | 2016504859 A | 2/2016 |

(Continued)

OTHER PUBLICATIONS

"Advanced Video Coding for Generic Audiovisual Services," Series H: Audiovisual and Multimedia Systems Infrastructure of Audiovisual Services—Coding of Moving Video, ITU-T H.264, Jun. 2019, 836 pages.

(Continued)

*Primary Examiner* — Rebecca A Volentine
(74) *Attorney, Agent, or Firm* — Conley Rose, P.C.

(57) ABSTRACT

A video coding mechanism is disclosed. The mechanism includes receiving a bitstream comprising a current picture and a reference picture list structure comprising an inter-layer reference picture flag. The mechanism determines an entry in the reference picture list structure associated with the current picture is an inter-layer reference picture (ILRP) entry based on the inter-layer reference picture flag. The current picture is decoded based on an inter-layer reference picture indicated by the entry in the reference picture list structure when the entry is the ILRP entry. The current picture is forwarded for display as part of a decoded video sequence.

17 Claims, 12 Drawing Sheets

Related U.S. Application Data

(60) Provisional application No. 62/854,827, filed on May 30, 2019.

(51) Int. Cl.
*H04N 19/172* (2014.01)
*H04N 19/46* (2014.01)

(56) References Cited

U.S. PATENT DOCUMENTS

| | | | |
|---|---|---|---|
| 2015/0103904 A1 | 4/2015 | Rapaka | |
| 2015/0195573 A1 | 7/2015 | Aflaki Beni et al. | |
| 2015/0334399 A1* | 11/2015 | Hendry | H04N 19/172 |
| | | | 375/240.12 |
| 2016/0198169 A1 | 7/2016 | Lee | |
| 2016/0227232 A1 | 8/2016 | Choi | |

FOREIGN PATENT DOCUMENTS

| | | |
|---|---|---|
| WO | 2015005331 A1 | 1/2015 |
| WO | 2015057706 A1 | 4/2015 |

OTHER PUBLICATIONS

"High Efficiency Video Coding," Series H: Audiovisual and Multimedia Systems Infrastructure of Audiovisual Services—Coding of Moving Video, ITU-T H.265, Dec. 2016, 664 pages.

"Line Transmission of Non-Telephone Signals, Video Codec for Audiovisual Services at p × 64 kbits," ITU-T Recommendation H.261, Mar. 3, 1993, 29 pages.

"Video Coding for Low Bit Rate Communication," Series H: Audiovisual and Multimedia Systems Infrastructure of Audiovisual Services—Coding of Moving Video, ITU-T H.263, Jan. 2005, 226 pages.

Bross, et al., "Versatile Video Coding (Draft 5)," Document JVET-N1001-v6, Joint Video Experts Team of ITU-T SG 16 WP 3 and ISO/IEC JTC 1/SC 29/WG 11, 14th Meeting: Geneva, CH, Mar. 19-27, 2019, 385 pages.

Document: JVET-M1001-v6, Bross, B., et al., "Versatile Video Coding (Draft 4)," Joint Video Experts Team (JVET) of ITU-T SG 16 WP 3 and ISO/IEC JTC 1/SC 29/WG 11 13th Meeting: Marrakech, MA, Jan. 9-18, 2019, 38 pages.

"Transmission of Non-Telephone Signals; Information Technology—Generic Coding of Moving Pictures and Associated Audio Information: Video," ITU-T Recommendation H.262, Jul. 1995, 211 pages.

Document: JVET-O2001-vE, Benjamin Bross et al., Versatile Video Coding (Draft 6), Joint Video Experts Team (JVET) of ITU-T SG 16 WP 3 and 1S0/IEC JTC 1/SC 29/WG 11, 15th Meeting: Gothenburg, SE, Jul. 3-12, 2019, 170 pages.

Document: JCT3V-H1002-v5, Gerhard Tech et al., MV-HEVC Draft Text 8, Joint Collaborative Team on 3D Video Coding Extensions ofITU-T SG 16 WP 3 and ISO/IEC JTC 1/SC 29/WG11, 8th Meeting: Valencia, ES, 29 Mar.-Apr. 4, 2014, 169 pages.

Document: JVET-N0134, Lee, J., et al., "CE3: Simplification of MPM derivation (CE3-3.2)," Joint Video Experts Team (JVET) of ITU-T SG 16 WP 3 and ISO/IEC JTC 1/SC 29/WG 11 14th Meeting: Geneva, CH, Mar. 19-27, 2019, 4 pages.

Document: JVET-P0334-v1, Wang, B., et al., "AHG17: On constant slice header parameter set in p. " Joint Video Experts Team (JVET) of ITU-T SG 16 WP 3 and ISO/IEC JTC 1/SC 29/WG 11 16th Meeting: Geneva, CH, Oct. 1-11, 2019, 7 pages.

\* cited by examiner

REFERENCE PICTURE MANAGEMENT IN LAYERED VIDEO CODING

CROSS-REFERENCE TO RELATED APPLICATIONS

This patent application is a continuation of International Application No. PCT/US2020/033595, filed May 19, 2020 by Ye-Kui Wang, et. al., and titled "Reference Picture Management In Layered Video Coding," which claims the benefit of U.S. Provisional Patent Application No. 62/854,827, filed May 30, 2019 by Ye-Kui Wang, and titled "Reference Picture Management In Layered Video Coding," which are hereby incorporated by reference.

TECHNICAL FIELD

The present disclosure is generally related to video coding, and is specifically related to reference picture management when employing in inter-layer prediction in video coding.

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable.

SUMMARY

In an embodiment, the disclosure includes a method implemented in a decoder, the method comprising: receiving, by a receiver of a decoder, a bitstream comprising a current picture and a reference picture list structure comprising an inter-layer reference picture flag; determining, by a processor of the decoder, an entry in the reference picture list structure associated with the current picture is an inter-layer reference picture (ILRP) entry based on the inter-layer reference picture flag; and decoding, by the processor, the current picture based on an inter-layer reference picture indicated by the entry in the reference picture list structure when the entry is the ILRP entry.

Video coding systems may encode picture according to inter-prediction. In inter-prediction, a picture is coded in reference to another picture. The picture being coded is referred to as a current picture and the picture used as a reference is referred to as a reference picture. Some video coding systems keep track the of reference pictures by employing a reference picture list. Some video coding systems employ scalable video coding. In scalable video coding, a video sequence is coded as a base layer and one or more enhancement layers. In this context, a picture can be split into portions that exist at different layers. For example, a lower layer version of the picture may be of lower quality than a higher layer version of the picture. Further, a lower layer version of the picture may be smaller (e.g., have a lower width and/or height) than a higher layer version of the picture. When using layers, a picture at a current layer can be coded according to intra-prediction (without a reference picture), coded according to inter-prediction by reference to a reference picture in the same layer, or coded according to inter-layer prediction by reference to a reference picture in a different layer. Some reference picture management systems may not be configured to manage reference pictures used in inter-layer prediction. The present example includes a mechanism for managing reference picture lists when employing inter-layer prediction. The reference picture list may be configured to include an entry for each reference picture used by the coded video. A flag can then be employed to indicate whether each entry contains an inter-prediction reference picture or an inter-layer reference picture. In an example, a group of reference picture flags for a syntax structure containing the reference picture lists can be denoted as inter_layer_ref_pic_flag[listIdx][rplsIdx][i]. Further, an ILRP layer indicator can be used to indicate which layer contains the indicated inter-layer reference picture. A decoder can then use the reference picture flags and the ILRP layer indicators to select the correct inter-layer reference pictures in order to perform inter-layer prediction. Accordingly, the disclosed mechanisms create additional functionality at the encoder and/or decoder. Further, the disclosed mechanisms may increase coding efficiency, which may reduce processor, memory, and/or network resource usage at the encoder and/or decoder.

Optionally, in any of the preceding aspects, another implementation of the aspect provides, wherein the reference picture list structure further comprises an ILRP layer indicator, and wherein the method further comprises determining, by the processor, a layer of the inter-layer reference picture based on the ILRP layer indicator when the entry is the ILRP entry.

Optionally, in any of the preceding aspects, another implementation of the aspect provides, wherein the reference picture list structure is denoted as ref_pic_list_struct (listIdx, rplsIdx) where listIdx identifies a reference picture list, rplsIdx identifies an entry in the reference picture list, and ref_pic_list_struct is a syntax structure.

Optionally, in any of the preceding aspects, another implementation of the aspect provides, wherein the inter-layer reference picture flag is denoted as inter_layer_ref_pic_flag[listIdx][rplsIdx][i], wherein inter_layer_ref_pic_flag[listIdx][rplsIdx][i] is equal to one when an i-th entry in the ref_pic_list_struct(listIdx, rplsIdx) is the ILRP entry, and wherein the inter_layer_ref_pic_flag[listIdx][rplsIdx][i] is equal to zero when the i-th entry in the ref_pic_list_struct(listIdx, rplsIdx) is not the ILRP entry.

Optionally, in any of the preceding aspects, another implementation of the aspect provides, further comprising decoding, by the processor, the current picture according to intra-layer prediction based on an intra-layer reference picture indicated by the entry in the reference picture list structure when the entry is not the ILRP entry.

Optionally, in any of the preceding aspects, another implementation of the aspect provides, wherein the ref_pic_list_struct(listIdx, rplsIdx) and the inter_layer_ref_pic_flag[listIdx][rplsIdx][i] are contained in the bitstream in a sequence parameter set (SPS).

Optionally, in any of the preceding aspects, another implementation of the aspect provides, wherein the inter-layer reference picture is in a same access unit (AU) as the current picture, and wherein the inter-layer reference picture is associated with a lower layer identifier than the current picture.

In an embodiment, the disclosure includes a method implemented in an encoder, the method comprising: encoding, by a processor of the encoder, a current picture into a bitstream, the current picture encoded according to inter-layer prediction based on an inter-layer reference picture; encoding, by the processor, a reference picture list structure into the bitstream, the reference picture list structure comprising a plurality of entries for a plurality of reference pictures including an entry associated with the current picture and indicating the inter-layer reference picture; encoding, by the processor, an inter-layer reference picture flag into the bitstream, the inter-layer reference picture flag indicating that the entry associated with the current picture is an ILRP entry; and storing, by a memory coupled to the processor, the bitstream for communication toward a decoder.

Video coding systems may encode picture according to inter-prediction. In inter-prediction, a picture is coded in reference to another picture. The picture being coded is referred to as a current picture and the picture used as a reference is referred to as a reference picture. Some video coding systems keep track the of reference pictures by employing a reference picture list. Some video coding systems employ scalable video coding. In scalable video coding, a video sequence is coded as a base layer and one or more enhancement layers. In this context, a picture can be split into portions that exist at different layers. For example, a lower layer version of the picture may be of lower quality than a higher layer version of the picture. Further, a lower layer version of the picture may be smaller (e.g., have a lower width and/or height) than a higher layer version of the picture. When using layers, a picture at a current layer can be coded according to intra-prediction (without a reference picture), coded according to inter-prediction by reference to a reference picture in the same layer, or coded according to inter-layer prediction by reference to a reference picture in a different layer. Some reference picture management systems may not be configured to manage reference pictures used in inter-layer prediction. The present example includes a mechanism for managing reference picture lists when employing inter-layer prediction. The reference picture list may be configured to include an entry for each reference picture used by the coded video. A flag can then be employed to indicate whether each entry contains an inter-prediction reference picture or an inter-layer reference picture. In an example, a group of reference picture flags for a syntax structure containing the reference picture lists can be denoted as inter_layer_ref_pic_flag[listIdx][rplsIdx][i]. Further, an ILRP layer indicator can be used to indicate which layer contains the indicated inter-layer reference picture. A decoder can then use the reference picture flags and the ILRP layer indicators to select the correct inter-layer reference pictures in order to perform inter-layer prediction. Accordingly, the disclosed mechanisms create additional functionality at the encoder and/or decoder. Further, the disclosed mechanisms may increase coding efficiency, which may reduce processor, memory, and/or network resource usage at the encoder and/or decoder.

Optionally, in any of the preceding aspects, another implementation of the aspect provides, further comprising encoding, by the processor, an ILRP layer indicator into the bitstream, the ILRP layer indicator indicating a layer of the inter-layer reference picture.

Optionally, in any of the preceding aspects, another implementation of the aspect provides, wherein the reference picture list structure is denoted as ref_pic_list_struct (listIdx, rplsIdx) where listIdx identifies a reference picture list, rplsIdx identifies an entry in the reference picture list, and ref_pic_list_struct is a syntax structure that returns the entry based on listIdx and rplsIdx.

Optionally, in any of the preceding aspects, another implementation of the aspect provides, wherein the inter-layer reference picture flag is denoted as inter_layer_ref_pic_flag[listIdx][rplsIdx][i], wherein the inter_layer_ref_pic_flag[listIdx][rplsIdx][i] is equal to one when an i-th entry in the ref_pic_list_struct(listIdx, rplsIdx) is the ILRP entry, and wherein the inter_layer_ref_pic_flag[listIdx][rplsIdx][i] is equal to zero when the i-th entry in the ref_pic_list_struct(listIdx, rplsIdx) is not the ILRP entry.

Optionally, in any of the preceding aspects, another implementation of the aspect provides, wherein the ref_pic_list_struct(listIdx, rplsIdx) and the inter_layer_ref_pic_flag[listIdx][rplsIdx][i] are encoded into the bitstream in a SPS.

Optionally, in any of the preceding aspects, another implementation of the aspect provides, wherein the ref_pic_list_struct(listIdx, rplsIdx) and the inter_layer_ref_pic_flag[listIdx][rplsIdx][i] are encoded into a header associated with the current picture.

Optionally, in any of the preceding aspects, another implementation of the aspect provides, wherein the inter-layer reference picture is in a same AU as the current picture, and wherein the inter-layer reference picture is associated with a lower layer identifier than the current picture.

In an embodiment, the disclosure includes a video coding device comprising: a processor, a receiver coupled to the processor, a memory coupled to the processor, and a transmitter coupled to the processor, wherein the processor, receiver, memory, and transmitter are configured to perform the method of any of the preceding aspects.

In an embodiment, the disclosure includes a non-transitory computer readable medium comprising a computer program product for use by a video coding device, the computer program product comprising computer executable instructions stored on the non-transitory computer readable medium such that when executed by a processor cause the video coding device to perform the method of any of the preceding aspects.

In an embodiment, the disclosure includes a decoder comprising: a receiving means for receiving a bitstream comprising a current picture, a reference picture list structure, and an inter-layer reference picture flag; a determining means for determining whether an entry in the reference picture list structure associated with the current picture is an ILRP entry based on the inter-layer reference picture flag; a decoding means for decoding the current picture according to inter-layer prediction based on an inter-layer reference picture indicated by the entry in the reference picture list structure when the entry is the ILRP entry; and a forwarding means for forwarding the current picture for display as part of a decoded video sequence.

Optionally, in any of the preceding aspects, another implementation of the aspect provides, wherein the decoder is further configured to perform the method of any of the preceding aspects.

In an embodiment, the disclosure includes an encoder comprising: an encoding means for: encoding a current picture into a bitstream, the current picture encoded according to inter-layer prediction based on an inter-layer reference picture; encoding a reference picture list structure into the bitstream, the reference picture list structure comprising a plurality of entries for a plurality of reference pictures including an entry associated with the current picture and indicating the inter-layer reference picture; and encoding an inter-layer reference picture flag into the bitstream, the inter-layer reference picture flag indicating that the entry associated with the current picture is an ILRP entry; and a storing means for storing the bitstream for communication toward a decoder.

Optionally, in any of the preceding aspects, another implementation of the aspect provides, wherein the encoder is further configured to perform the method of any of the preceding aspects.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
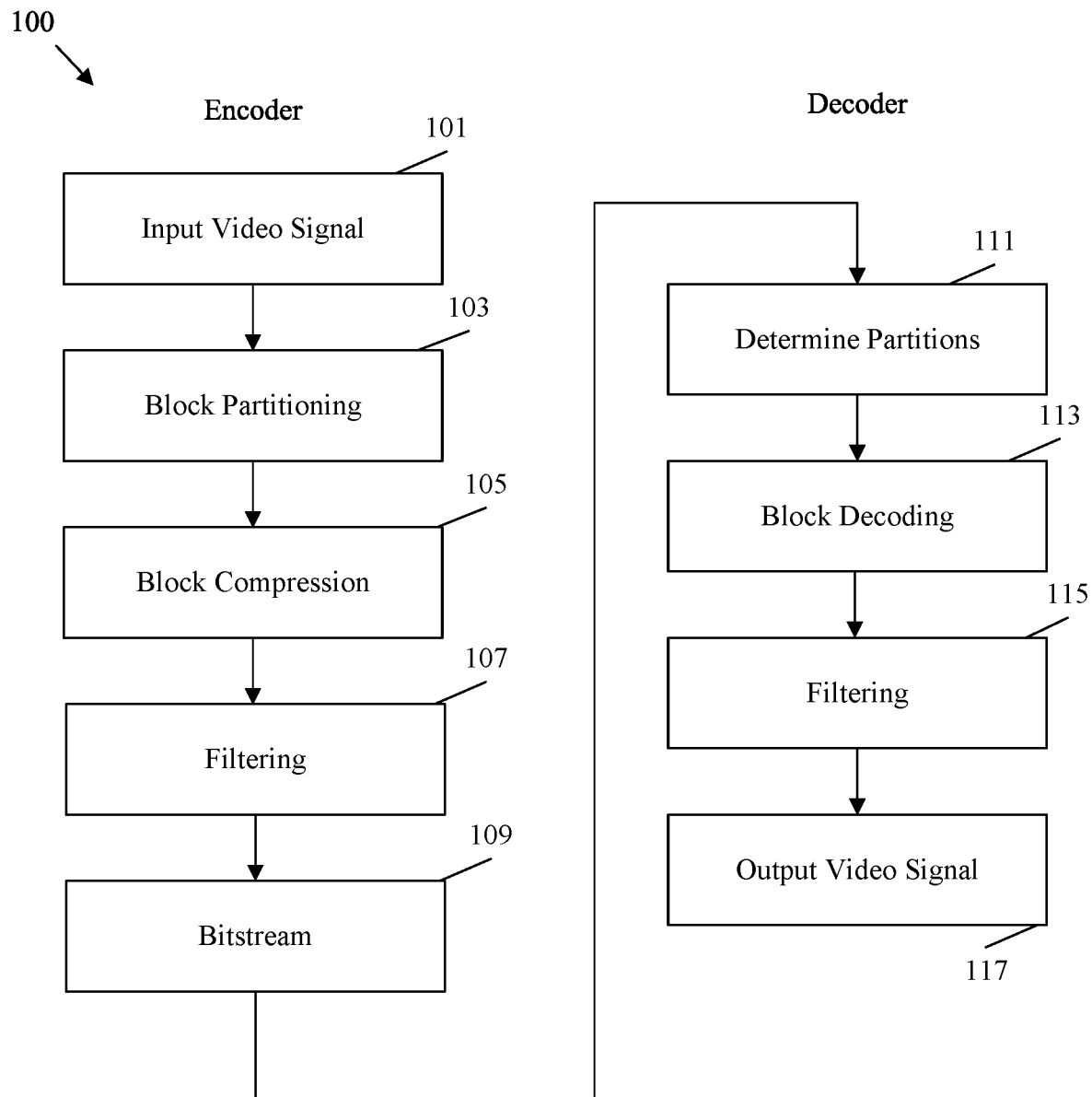
FIG. 1 is a flowchart of an example method of coding a video signal.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following terms are defined as follows unless used in a contrary context herein. Specifically, the following definitions are intended to provide additional clarity to the present disclosure. However, terms may be described differently in different contexts. Accordingly, the following definitions should be considered as a supplement and should not be considered to limit any other definitions of descriptions provided for such terms herein.

A bitstream is a sequence of bits including video data that is compressed for transmission between an encoder and a decoder. An encoder is a device that is configured to employ encoding processes to compress video data into a bitstream. A decoder is a device that is configured to employ decoding processes to reconstruct video data from a bitstream for display. A picture is an array of luma samples and/or an array of chroma samples that create a frame or a field thereof. A picture that is being encoded or decoded can be referred to as a current picture for clarity of discussion. A reference picture is a picture that contains reference samples that can be used when coding other pictures by reference according to inter-prediction and/or inter-layer prediction. A reference picture list is a list of reference pictures used for inter-prediction and/or inter-layer prediction. Some video coding systems reference two picture lists, which can be denoted as reference picture list one and reference picture list zero. A reference picture list structure is an addressable syntax structure that contains multiple reference picture lists. A layer is a group of pictures that are all associated with a similar value of a characteristic, such as a similar size, quality, resolution, signal to noise ratio, capability, etc. A layer identifier (ID) is an item of data that is associated with a picture and denotes the picture is part of an indicated layer. Inter-prediction is a mechanism of coding samples of a current picture by reference to indicated samples in a reference picture that is different from the current picture where the reference picture and the current picture are in the same layer. In an inter-layer context, inter-prediction can also be referred to as intra-layer prediction since both the current picture and the reference picture are in the same layer. Inter-layer prediction is a mechanism of coding samples of a current picture by reference to indicated samples in a reference picture where the current picture and the reference picture are in different layers and hence have different layer IDs. An inter-layer reference picture is a reference picture used for inter-layer prediction. Some video coding systems may require that a current picture and an associated inter-layer reference picture are included in the same access unit (AU). A reference picture list structure entry is an addressable location in a reference picture list structure that indicates a reference picture associated with a reference picture list. An inter-layer reference picture (ILRP) entry is an entry that contains a reference picture that is used for inter-layer prediction. An inter-layer reference picture flag is data indicating that a reference picture in an entry of the reference picture list structure is an inter-layer reference picture. An ILRP layer indicator is data that indicates a layer associated with an inter-layer reference picture that is referenced by a current picture. A slice header is a part of a coded slice containing data elements pertaining to all video data within a tile represented in the slice. A sequence parameter set (SPS) is a parameter set that contains data related to a sequence of pictures. An AU is a set of one or more coded pictures associated with the same display time (e.g., the same picture order count) for output from a decoded picture buffer (DPB) (e.g., for display to a user). A decoded video sequence is a sequence of pictures that have been reconstructed by a decoder in preparation for display to a user.

The following acronyms are used herein, Coding Tree Block (CTB), Coding Tree Unit (CTU), Coding Unit (CU), Coded Video Sequence (CVS), Decoded Picture Buffer (DPB), Joint Video Experts Team (JVET), Motion-Constrained Tile Set (MCTS), Maximum Transfer Unit (MTU), Network Abstraction Layer (NAL), Picture Order Count (POC), Random Access Decodable Leading (RADL) picture, Random Access Skipped Leading (RASL) picture, Raw Byte Sequence Payload (RBSP), Reference Picture List (RPL), Sequence Parameter Set (SPS), Video Coding Layer (VCL), Versatile Video Coding (VVC), and Working Draft (WD).

Many video compression techniques can be employed to reduce the size of video files with minimal loss of data. For example, video compression techniques can include performing spatial (e.g., intra-picture) prediction and/or temporal (e.g., inter-picture) prediction to reduce or remove data redundancy in video sequences. For block-based video coding, a video slice (e.g., a video picture or a portion of a video picture) may be partitioned into video blocks, which may also be referred to as treeblocks, coding tree blocks (CTBs), coding tree units (CTUs), coding units (CUs), and/or coding nodes. Video blocks in an intra-coded (I) slice of a picture are coded using spatial prediction with respect to reference samples in neighboring blocks in the same picture. Video blocks in an inter-coded unidirectional prediction (P) or bidirectional prediction (B) slice of a picture may be coded by employing spatial prediction with respect to reference samples in neighboring blocks in the same picture or temporal prediction with respect to reference samples in other reference pictures. Pictures may be referred to as frames and/or images, and reference pictures may be referred to as reference frames and/or reference images. Spatial or temporal prediction results in a predictive block representing an image block. Residual data represents pixel differences between the original image block and the predictive block. Accordingly, an inter-coded block is encoded according to a motion vector that points to a block of reference samples forming the predictive block and the residual data indicating the difference between the coded block and the predictive block. An intra-coded block is encoded according to an intra-coding mode and the residual data. For further compression, the residual data may be transformed from the pixel domain to a transform domain. These result in residual transform coefficients, which may be quantized. The quantized transform coefficients may initially be arranged in a two-dimensional array. The quantized transform coefficients may be scanned in order to produce a one-dimensional vector of transform coefficients. Entropy coding may be applied to achieve even more compression. Such video compression techniques are discussed in greater detail below.

To ensure an encoded video can be accurately decoded, video is encoded and decoded according to corresponding video coding standards. Video coding standards include International Telecommunication Union (ITU) Standardization Sector (ITU-T) H.261, International Organization for Standardization/International Electrotechnical Commission (ISO/IEC) Motion Picture Experts Group (MPEG)-1 Part 2, ITU-T H.262 or ISO/IEC MPEG-2 Part 2, ITU-T H.263, ISO/IEC MPEG-4 Part 2, Advanced Video Coding (AVC), also known as ITU-T H.264 or ISO/IEC MPEG-4 Part 10, and High Efficiency Video Coding (HEVC), also known as ITU-T H.265 or MPEG-H Part 2. AVC includes extensions such as Scalable Video Coding (SVC), Multiview Video Coding (MVC) and Multiview Video Coding plus Depth (MVC+D), and three dimensional (3D) AVC (3D-AVC). HEVC includes extensions such as Scalable HEVC (SHVC), Multiview HEVC (MV-HEVC), and 3D HEVC (3D-HEVC). The joint video experts team (JVET) of ITU-T and ISO/IEC has begun developing a video coding standard referred to as Versatile Video Coding (VVC). VVC is included in a Working Draft (WD), which includes JVET-N1001-v6.

Video coding systems may encode pictures according to inter-prediction. In inter-prediction, a picture is coded by reference to another picture. The picture being coded is referred to as a current picture and the picture used as a reference is referred to as a reference picture. Some video coding systems keep track the of reference pictures by employing a reference picture list. Further, some video coding systems employ scalable video coding. In scalable video coding, a video sequence is coded as a base layer and one or more enhancement layers. In this context, a picture can be split into multiple pictures that exist at different layers. For example, a lower layer version of the picture may be of lower quality than a higher layer version of the picture. Further, a lower layer version of the picture may be smaller (e.g., have a lower width and/or height) than a higher layer version of the picture. When using layers, a picture at a current layer can be coded according to intra-prediction (without a reference picture), coded according to inter-prediction by reference to a reference picture in the same layer, or coded according to inter-layer prediction by reference to a reference picture in a different layer. However, reference picture lists may not be designed to describe reference pictures across multiple layers.

Disclosed herein are example mechanisms for managing reference picture lists when employing inter-layer prediction. For example, the reference picture list may be configured to include an entry for each reference picture used by the coded video. A flag can then be employed to indicate whether each entry contains an inter-prediction reference picture (for reference in the same level) or an inter-layer reference picture (for reference between layers). In an example, the group of reference picture flags for a syntax structure containing the reference picture lists can be denoted as inter_layer_ref_pic_flag[listIdx][rplsIdx][i]. The inter_layer_ref_pic_flag[listIdx][rplsIdx][i] flag can be set equal to one when an i-th entry in a reference picture structure is an ILRP entry or set to zero when the i-th entry in the reference picture structure is not an ILRP entry. Further, an ILRP layer indicator can be used to indicate which layer contains the inter-layer reference picture indicated by the entry of the reference picture structure. A decoder can then use the reference picture flags and the ILRP layer indicators to select the correct inter-layer reference pictures in order to perform inter-layer prediction. Accordingly, the disclosed mechanisms create additional functionality at the encoder and/or decoder. Further, the disclosed mechanisms may increase coding efficiency, which may reduce processor, memory, and/or network resource usage at the encoder and/or decoder.

FIG. 1 is a flowchart of an example operating method 100 of coding a video signal. Specifically, a video signal is encoded at an encoder. The encoding process compresses the video signal by employing various mechanisms to reduce the video file size. A smaller file size allows the compressed video file to be transmitted toward a user, while reducing associated bandwidth overhead. The decoder then decodes the compressed video file to reconstruct the original video signal for display to an end user. The decoding process generally mirrors the encoding process to allow the decoder to consistently reconstruct the video signal.

At step 101, the video signal is input into the encoder. For example, the video signal may be an uncompressed video file stored in memory. As another example, the video file may be captured by a video capture device, such as a video camera, and encoded to support live streaming of the video. The video file may include both an audio component and a video component. The video component contains a series of image frames that, when viewed in a sequence, gives the visual impression of motion. The frames contain pixels that are expressed in terms of light, referred to herein as luma components (or luma samples), and color, which is referred to as chroma components (or color samples). In some examples, the frames may also contain depth values to support three dimensional viewing.

At step 103, the video is partitioned into blocks. Partitioning includes subdividing the pixels in each frame into square and/or rectangular blocks for compression. For example, in High Efficiency Video Coding (HEVC) (also known as H.265 and MPEG-H Part 2) the frame can first be divided into coding tree units (CTUs), which are blocks of a predefined size (e.g., sixty-four pixels by sixty-four pixels). The CTUs contain both luma and chroma samples. Coding trees may be employed to divide the CTUs into blocks and then recursively subdivide the blocks until configurations are achieved that support further encoding. For example, luma components of a frame may be subdivided until the individual blocks contain relatively homogenous lighting values. Further, chroma components of a frame may be subdivided until the individual blocks contain relatively homogenous color values. Accordingly, partitioning mechanisms vary depending on the content of the video frames.

At step 105, various compression mechanisms are employed to compress the image blocks partitioned at step 103. For example, inter-prediction and/or intra-prediction may be employed. Inter-prediction is designed to take advantage of the fact that objects in a common scene tend to appear in successive frames. Accordingly, a block depicting an object in a reference frame need not be repeatedly described in adjacent frames. Specifically, an object, such as a table, may remain in a constant position over multiple frames. Hence the table is described once and adjacent frames can refer back to the reference frame. Pattern matching mechanisms may be employed to match objects over multiple frames. Further, moving objects may be represented across multiple frames, for example due to object movement or camera movement. As a particular example, a video may show an automobile that moves across the screen over multiple frames. Motion vectors can be employed to describe such movement. A motion vector is a two-dimensional vector that provides an offset from the coordinates of an object in a frame to the coordinates of the object in a reference frame. As such, inter-prediction can encode an image block in a current frame as a set of motion vectors indicating an offset from a corresponding block in a reference frame.

Intra-prediction encodes blocks in a common frame. Intra-prediction takes advantage of the fact that luma and chroma components tend to cluster in a frame. For example, a patch of green in a portion of a tree tends to be positioned adjacent to similar patches of green. Intra-prediction employs multiple directional prediction modes (e.g., thirty-three in HEVC), a planar mode, and a direct current (DC) mode. The directional modes indicate that a current block is similar/the same as samples of a neighbor block in a corresponding direction. Planar mode indicates that a series of blocks along a row/column (e.g., a plane) can be interpolated based on neighbor blocks at the edges of the row. Planar mode, in effect, indicates a smooth transition of light/color across a row/column by employing a relatively constant slope in changing values. DC mode is employed for boundary smoothing and indicates that a block is similar/the same as an average value associated with samples of all the neighbor blocks associated with the angular directions of the directional prediction modes. Accordingly, intra-prediction blocks can represent image blocks as various relational prediction mode values instead of the actual values. Further, inter-prediction blocks can represent image blocks as motion vector values instead of the actual values. In either case, the prediction blocks may not exactly represent the image blocks in some cases. Any differences are stored in residual blocks. Transforms may be applied to the residual blocks to further compress the file.

At step 107, various filtering techniques may be applied. In HEVC, the filters are applied according to an in-loop filtering scheme. The block based prediction discussed above may result in the creation of blocky images at the decoder. Further, the block based prediction scheme may encode a block and then reconstruct the encoded block for later use as a reference block. The in-loop filtering scheme iteratively applies noise suppression filters, de-blocking filters, adaptive loop filters, and sample adaptive offset (SAO) filters to the blocks/frames. These filters mitigate such blocking artifacts so that the encoded file can be accurately reconstructed. Further, these filters mitigate artifacts in the reconstructed reference blocks so that artifacts are less likely to create additional artifacts in subsequent blocks that are encoded based on the reconstructed reference blocks.

Once the video signal has been partitioned, compressed, and filtered, the resulting data is encoded in a bitstream at step 109. The bitstream includes the data discussed above as well as any signaling data desired to support proper video signal reconstruction at the decoder. For example, such data may include partition data, prediction data, residual blocks, and various flags providing coding instructions to the decoder. The bitstream may be stored in memory for transmission toward a decoder upon request. The bitstream may also be broadcast and/or multicast toward a plurality of decoders. The creation of the bitstream is an iterative process. Accordingly, steps 101, 103, 105, 107, and 109 may occur continuously and/or simultaneously over many frames and blocks. The order shown in FIG. 1 is presented for clarity and ease of discussion, and is not intended to limit the video coding process to a particular order.

The decoder receives the bitstream and begins the decoding process at step 111. Specifically, the decoder employs an entropy decoding scheme to convert the bitstream into corresponding syntax and video data. The decoder employs the syntax data from the bitstream to determine the partitions for the frames at step 111. The partitioning should match the results of block partitioning at step 103. Entropy encoding/decoding as employed in step 111 is now described. The encoder makes many choices during the compression process, such as selecting block partitioning schemes from several possible choices based on the spatial positioning of values in the input image(s). Signaling the exact choices may employ a large number of bins. As used herein, a bin is a binary value that is treated as a variable (e.g., a bit value that may vary depending on context). Entropy coding allows the encoder to discard any options that are clearly not viable for a particular case, leaving a set of allowable options. Each allowable option is then assigned a code word. The length of the code words is based on the number of allowable options (e.g., one bin for two options, two bins for three to four options, etc.) The encoder then encodes the code word for the selected option. This scheme reduces the size of the code words as the code words are as big as desired to uniquely indicate a selection from a small sub-set of allowable options as opposed to uniquely indicating the selection from a potentially large set of all possible options. The decoder then decodes the selection by determining the set of allowable options in a similar manner to the encoder. By determining the set of allowable options, the decoder can read the code word and determine the selection made by the encoder.

At step 113, the decoder performs block decoding. Specifically, the decoder employs reverse transforms to generate residual blocks. Then the decoder employs the residual blocks and corresponding prediction blocks to reconstruct the image blocks according to the partitioning. The prediction blocks may include both intra-prediction blocks and inter-prediction blocks as generated at the encoder at step 105. The reconstructed image blocks are then positioned into frames of a reconstructed video signal according to the partitioning data determined at step 111. Syntax for step 113 may also be signaled in the bitstream via entropy coding as discussed above.

At step 115, filtering is performed on the frames of the reconstructed video signal in a manner similar to step 107 at the encoder. For example, noise suppression filters, deblocking filters, adaptive loop filters, and SAO filters may be applied to the frames to remove blocking artifacts. Once the frames are filtered, the video signal can be output to a display at step 117 for viewing by an end user.

Figure 2:
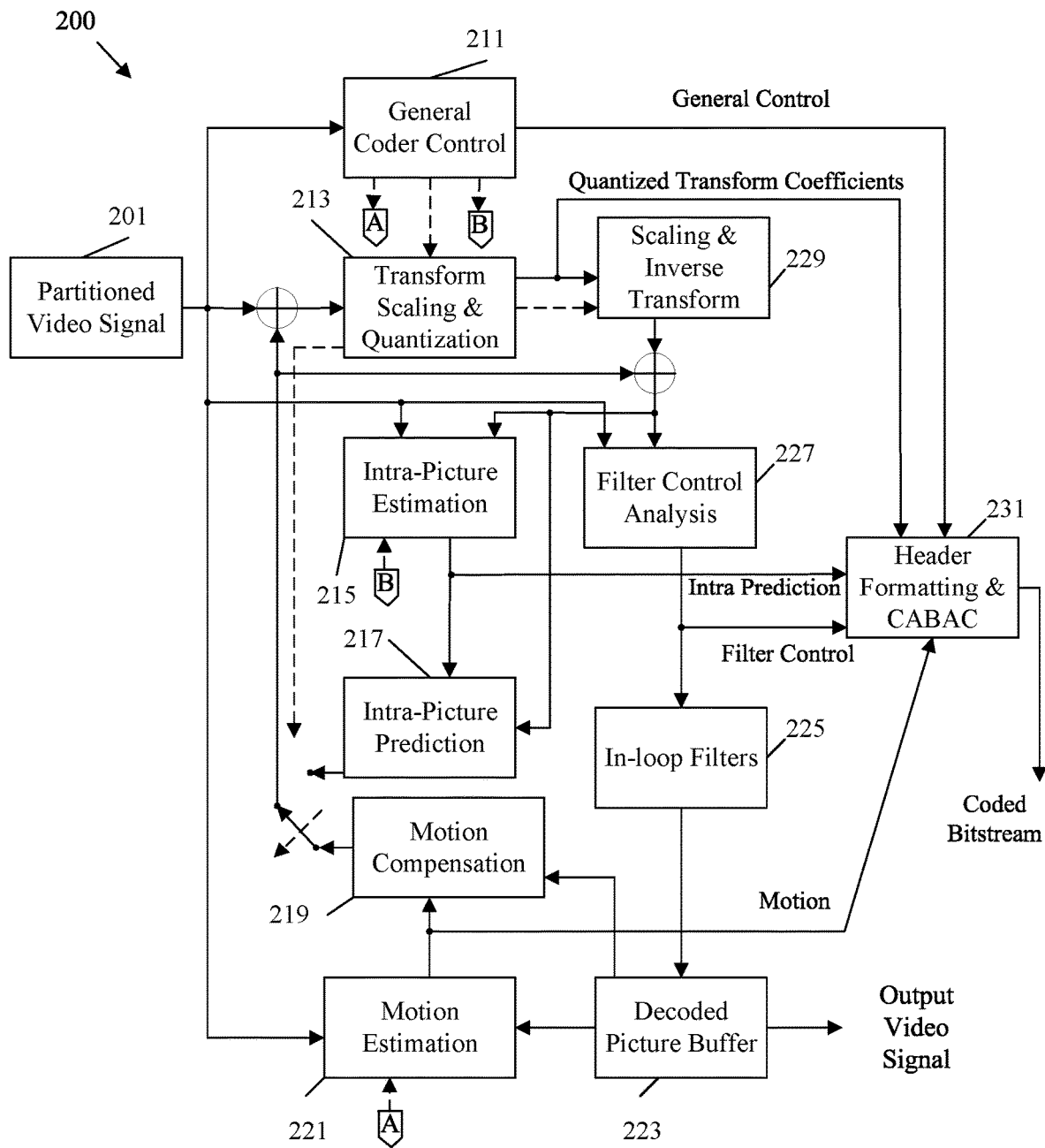
FIG. 2 is a schematic diagram of an example coding and decoding (codec) system for video coding.

FIG. 2 is a schematic diagram of an example coding and decoding (codec) system 200 for video coding. Specifically, codec system 200 provides functionality to support the implementation of operating method 100. Codec system 200 is generalized to depict components employed in both an encoder and a decoder. Codec system 200 receives and partitions a video signal as discussed with respect to steps 101 and 103 in operating method 100, which results in a partitioned video signal 201. Codec system 200 then compresses the partitioned video signal 201 into a coded bitstream when acting as an encoder as discussed with respect to steps 105, 107, and 109 in method 100. When acting as a decoder, codec system 200 generates an output video signal from the bitstream as discussed with respect to steps 111, 113, 115, and 117 in operating method 100. The codec system 200 includes a general coder control component 211, a transform scaling and quantization component 213, an intra-picture estimation component 215, an intra-picture prediction component 217, a motion compensation component 219, a motion estimation component 221, a scaling and inverse transform component 229, a filter control analysis component 227, an in-loop filters component 225, a decoded picture buffer component 223, and a header formatting and context adaptive binary arithmetic coding (CABAC) component 231. Such components are coupled as shown. In FIG. 2, black lines indicate movement of data to be encoded/decoded while dashed lines indicate movement of control data that controls the operation of other components. The components of codec system 200 may all be present in the encoder. The decoder may include a subset of the components of codec system 200. For example, the decoder may include the intra-picture prediction component 217, the motion compensation component 219, the scaling and inverse transform component 229, the in-loop filters component 225, and the decoded picture buffer component 223. These components are now described.

The partitioned video signal 201 is a captured video sequence that has been partitioned into blocks of pixels by a coding tree. A coding tree employs various split modes to subdivide a block of pixels into smaller blocks of pixels. These blocks can then be further subdivided into smaller blocks. The blocks may be referred to as nodes on the coding tree. Larger parent nodes are split into smaller child nodes. The number of times a node is subdivided is referred to as the depth of the node/coding tree. The divided blocks can be included in coding units (CUs) in some cases. For example, a CU can be a sub-portion of a CTU that contains a luma block, red difference chroma (Cr) block(s), and a blue difference chroma (Cb) block(s) along with corresponding syntax instructions for the CU. The split modes may include a binary tree (BT), triple tree (TT), and a quad tree (QT) employed to partition a node into two, three, or four child nodes, respectively, of varying shapes depending on the split modes employed. The partitioned video signal 201 is forwarded to the general coder control component 211, the transform scaling and quantization component 213, the intra-picture estimation component 215, the filter control analysis component 227, and the motion estimation component 221 for compression.

The general coder control component 211 is configured to make decisions related to coding of the images of the video sequence into the bitstream according to application constraints. For example, the general coder control component 211 manages optimization of bitrate/bitstream size versus reconstruction quality. Such decisions may be made based on storage space/bandwidth availability and image resolution requests. The general coder control component 211 also manages buffer utilization in light of transmission speed to mitigate buffer underrun and overrun issues. To manage these issues, the general coder control component 211 manages partitioning, prediction, and filtering by the other components. For example, the general coder control component 211 may dynamically increase compression complexity to increase resolution and increase bandwidth usage or decrease compression complexity to decrease resolution and bandwidth usage. Hence, the general coder control component 211 controls the other components of codec system 200 to balance video signal reconstruction quality with bit rate concerns. The general coder control component 211 creates control data, which controls the operation of the other components. The control data is also forwarded to the header formatting and CABAC component 231 to be encoded in the bitstream to signal parameters for decoding at the decoder.

The partitioned video signal 201 is also sent to the motion estimation component 221 and the motion compensation component 219 for inter-prediction. A frame or slice of the partitioned video signal 201 may be divided into multiple video blocks. Motion estimation component 221 and the motion compensation component 219 perform inter-predictive coding of the received video block relative to one or more blocks in one or more reference frames to provide temporal prediction. Codec system 200 may perform multiple coding passes, e.g., to select an appropriate coding mode for each block of video data.

Motion estimation component 221 and motion compensation component 219 may be highly integrated, but are illustrated separately for conceptual purposes. Motion estimation, performed by motion estimation component 221, is the process of generating motion vectors, which estimate motion for video blocks. A motion vector, for example, may indicate the displacement of a coded object relative to a predictive block. A predictive block is a block that is found to closely match the block to be coded, in terms of pixel difference. A predictive block may also be referred to as a reference block. Such pixel difference may be determined by sum of absolute difference (SAD), sum of square difference (SSD), or other difference metrics. HEVC employs several coded objects including a CTU, coding tree blocks (CTBs), and CUs. For example, a CTU can be divided into CTBs, which can then be divided into CBs for inclusion in CUs. A CU can be encoded as a prediction unit (PU) containing prediction data and/or a transform unit (TU) containing transformed residual data for the CU. The motion estimation component 221 generates motion vectors, PUs, and TUs by using a rate-distortion analysis as part of a rate distortion optimization process. For example, the motion estimation component 221 may determine multiple reference blocks, multiple motion vectors, etc. for a current block/frame, and may select the reference blocks, motion vectors, etc. having the best rate-distortion characteristics. The best rate-distortion characteristics balance both quality of video reconstruction (e.g., amount of data loss by compression) with coding efficiency (e.g., size of the final encoding).

In some examples, codec system 200 may calculate values for sub-integer pixel positions of reference pictures stored in decoded picture buffer component 223. For example, video codec system 200 may interpolate values of one-quarter pixel positions, one-eighth pixel positions, or other fractional pixel positions of the reference picture. Therefore, motion estimation component 221 may perform a motion search relative to the full pixel positions and fractional pixel positions and output a motion vector with fractional pixel precision. The motion estimation component 221 calculates a motion vector for a PU of a video block in an inter-coded slice by comparing the position of the PU to the position of a predictive block of a reference picture. Motion estimation component 221 outputs the calculated motion vector as motion data to header formatting and CABAC component 231 for encoding and motion to the motion compensation component 219.

Motion compensation, performed by motion compensation component 219, may involve fetching or generating the predictive block based on the motion vector determined by motion estimation component 221. Again, motion estimation component 221 and motion compensation component 219 may be functionally integrated, in some examples. Upon receiving the motion vector for the PU of the current video block, motion compensation component 219 may locate the predictive block to which the motion vector points. A residual video block is then formed by subtracting pixel values of the predictive block from the pixel values of the current video block being coded, forming pixel difference values. In general, motion estimation component 221 performs motion estimation relative to luma components, and motion compensation component 219 uses motion vectors calculated based on the luma components for both chroma components and luma components. The predictive block and residual block are forwarded to transform scaling and quantization component 213.

The partitioned video signal 201 is also sent to intra-picture estimation component 215 and intra-picture prediction component 217. As with motion estimation component 221 and motion compensation component 219, intra-picture estimation component 215 and intra-picture prediction component 217 may be highly integrated, but are illustrated separately for conceptual purposes. The intra-picture estimation component 215 and intra-picture prediction component 217 intra-predict a current block relative to blocks in a current frame, as an alternative to the inter-prediction performed by motion estimation component 221 and motion compensation component 219 between frames, as described above. In particular, the intra-picture estimation component 215 determines an intra-prediction mode to use to encode a current block. In some examples, intra-picture estimation component 215 selects an appropriate intra-prediction mode to encode a current block from multiple tested intra-prediction modes. The selected intra-prediction modes are then forwarded to the header formatting and CABAC component 231 for encoding.

For example, the intra-picture estimation component 215 calculates rate-distortion values using a rate-distortion analysis for the various tested intra-prediction modes, and selects the intra-prediction mode having the best rate-distortion characteristics among the tested modes. Rate-distortion analysis generally determines an amount of distortion (or error) between an encoded block and an original unencoded block that was encoded to produce the encoded block, as well as a bitrate (e.g., a number of bits) used to produce the encoded block. The intra-picture estimation component 215 calculates ratios from the distortions and rates for the various encoded blocks to determine which intra-prediction mode exhibits the best rate-distortion value for the block. In addition, intra-picture estimation component 215 may be configured to code depth blocks of a depth map using a depth modeling mode (DMM) based on rate-distortion optimization (RDO).

The intra-picture prediction component 217 may generate a residual block from the predictive block based on the selected intra-prediction modes determined by intra-picture estimation component 215 when implemented on an encoder or read the residual block from the bitstream when implemented on a decoder. The residual block includes the difference in values between the predictive block and the original block, represented as a matrix. The residual block is then forwarded to the transform scaling and quantization component 213. The intra-picture estimation component 215 and the intra-picture prediction component 217 may operate on both luma and chroma components.

The transform scaling and quantization component 213 is configured to further compress the residual block. The transform scaling and quantization component 213 applies a transform, such as a discrete cosine transform (DCT), a discrete sine transform (DST), or a conceptually similar transform, to the residual block, producing a video block comprising residual transform coefficient values. Wavelet transforms, integer transforms, sub-band transforms or other types of transforms could also be used. The transform may convert the residual information from a pixel value domain to a transform domain, such as a frequency domain. The transform scaling and quantization component 213 is also configured to scale the transformed residual information, for example based on frequency. Such scaling involves applying a scale factor to the residual information so that different frequency information is quantized at different granularities, which may affect final visual quality of the reconstructed video. The transform scaling and quantization component 213 is also configured to quantize the transform coefficients to further reduce bit rate. The quantization process may reduce the bit depth associated with some or all of the coefficients. The degree of quantization may be modified by adjusting a quantization parameter. In some examples, the transform scaling and quantization component 213 may then perform a scan of the matrix including the quantized transform coefficients. The quantized transform coefficients are forwarded to the header formatting and CABAC component 231 to be encoded in the bitstream.

The scaling and inverse transform component 229 applies a reverse operation of the transform scaling and quantization component 213 to support motion estimation. The scaling and inverse transform component 229 applies inverse scaling, transformation, and/or quantization to reconstruct the residual block in the pixel domain, e.g., for later use as a reference block which may become a predictive block for another current block. The motion estimation component 221 and/or motion compensation component 219 may calculate a reference block by adding the residual block back to a corresponding predictive block for use in motion estimation of a later block/frame. Filters are applied to the reconstructed reference blocks to mitigate artifacts created during scaling, quantization, and transform. Such artifacts could otherwise cause inaccurate prediction (and create additional artifacts) when subsequent blocks are predicted.

The filter control analysis component 227 and the in-loop filters component 225 apply the filters to the residual blocks and/or to reconstructed image blocks. For example, the transformed residual block from the scaling and inverse transform component 229 may be combined with a corresponding prediction block from intra-picture prediction component 217 and/or motion compensation component 219 to reconstruct the original image block. The filters may then be applied to the reconstructed image block. In some examples, the filters may instead be applied to the residual blocks. As with other components in FIG. 2, the filter control analysis component 227 and the in-loop filters component 225 are highly integrated and may be implemented together, but are depicted separately for conceptual purposes. Filters applied to the reconstructed reference blocks are applied to particular spatial regions and include multiple parameters to adjust how such filters are applied. The filter control analysis component 227 analyzes the reconstructed reference blocks to determine where such filters should be applied and sets corresponding parameters. Such data is forwarded to the header formatting and CABAC component 231 as filter control data for encoding. The in-loop filters component 225 applies such filters based on the filter control data. The filters may include a deblocking filter, a noise suppression filter, a SAO filter, and an adaptive loop filter. Such filters may be applied in the spatial/pixel domain (e.g., on a reconstructed pixel block) or in the frequency domain, depending on the example.

When operating as an encoder, the filtered reconstructed image block, residual block, and/or prediction block are stored in the decoded picture buffer component 223 for later use in motion estimation as discussed above. When operating as a decoder, the decoded picture buffer component 223 stores and forwards the reconstructed and filtered blocks toward a display as part of an output video signal. The decoded picture buffer component 223 may be any memory device capable of storing prediction blocks, residual blocks, and/or reconstructed image blocks.

The header formatting and CABAC component 231 receives the data from the various components of codec system 200 and encodes such data into a coded bitstream for transmission toward a decoder. Specifically, the header formatting and CABAC component 231 generates various headers to encode control data, such as general control data and filter control data. Further, prediction data, including intra-prediction and motion data, as well as residual data in the form of quantized transform coefficient data are all encoded in the bitstream. The final bitstream includes all information desired by the decoder to reconstruct the original partitioned video signal 201. Such information may also include intra-prediction mode index tables (also referred to as codeword mapping tables), definitions of encoding contexts for various blocks, indications of most probable intra-prediction modes, an indication of partition information, etc. Such data may be encoded by employing entropy coding. For example, the information may be encoded by employing context adaptive variable length coding (CAVLC), CABAC, syntax-based context-adaptive binary arithmetic coding (SBAC), probability interval partitioning entropy (PIPE) coding, or another entropy coding technique. Following the entropy coding, the coded bitstream may be transmitted to another device (e.g., a video decoder) or archived for later transmission or retrieval.

Figure 3:
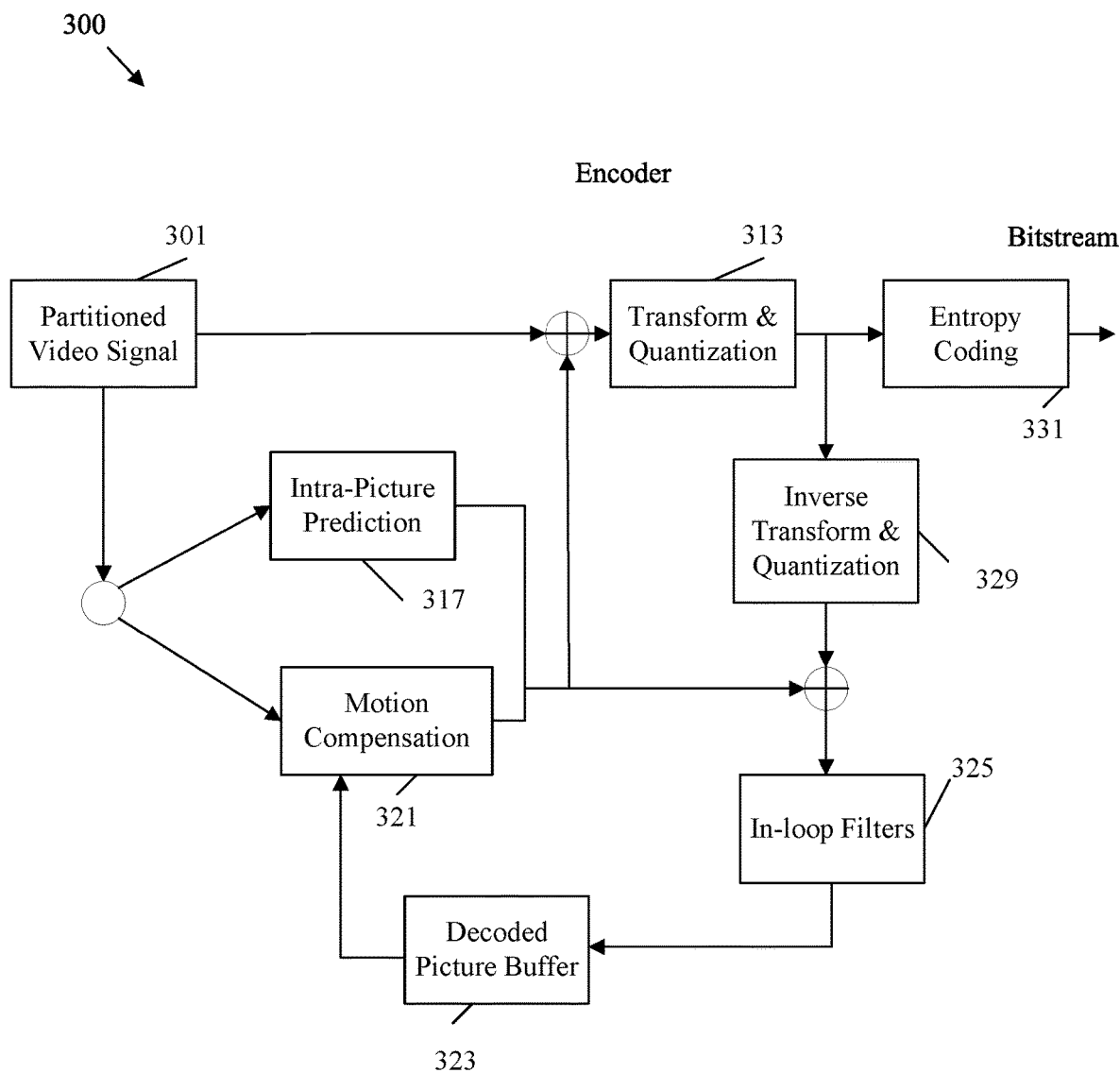
FIG. 3 is a schematic diagram illustrating an example video encoder.

FIG. 3 is a block diagram illustrating an example video encoder 300. Video encoder 300 may be employed to implement the encoding functions of codec system 200 and/or implement steps 101, 103, 105, 107, and/or 109 of operating method 100. Encoder 300 partitions an input video signal, resulting in a partitioned video signal 301, which is substantially similar to the partitioned video signal 201. The partitioned video signal 301 is then compressed and encoded into a bitstream by components of encoder 300.

Specifically, the partitioned video signal 301 is forwarded to an intra-picture prediction component 317 for intra-prediction. The intra-picture prediction component 317 may be substantially similar to intra-picture estimation component 215 and intra-picture prediction component 217. The partitioned video signal 301 is also forwarded to a motion compensation component 321 for inter-prediction based on reference blocks in a decoded picture buffer component 323. The motion compensation component 321 may be substantially similar to motion estimation component 221 and motion compensation component 219. The prediction blocks and residual blocks from the intra-picture prediction component 317 and the motion compensation component 321 are forwarded to a transform and quantization component 313 for transform and quantization of the residual blocks. The transform and quantization component 313 may be substantially similar to the transform scaling and quantization component 213. The transformed and quantized residual blocks and the corresponding prediction blocks (along with associated control data) are forwarded to an entropy coding component 331 for coding into a bitstream. The entropy coding component 331 may be substantially similar to the header formatting and CABAC component 231.

The transformed and quantized residual blocks and/or the corresponding prediction blocks are also forwarded from the transform and quantization component 313 to an inverse transform and quantization component 329 for reconstruction into reference blocks for use by the motion compensation component 321. The inverse transform and quantization component 329 may be substantially similar to the scaling and inverse transform component 229. In-loop filters in an in-loop filters component 325 are also applied to the residual blocks and/or reconstructed reference blocks, depending on the example. The in-loop filters component 325 may be substantially similar to the filter control analysis component 227 and the in-loop filters component 225. The in-loop filters component 325 may include multiple filters as discussed with respect to in-loop filters component 225. The filtered blocks are then stored in a decoded picture buffer component 323 for use as reference blocks by the motion compensation component 321. The decoded picture buffer component 323 may be substantially similar to the decoded picture buffer component 223.

Figure 4:
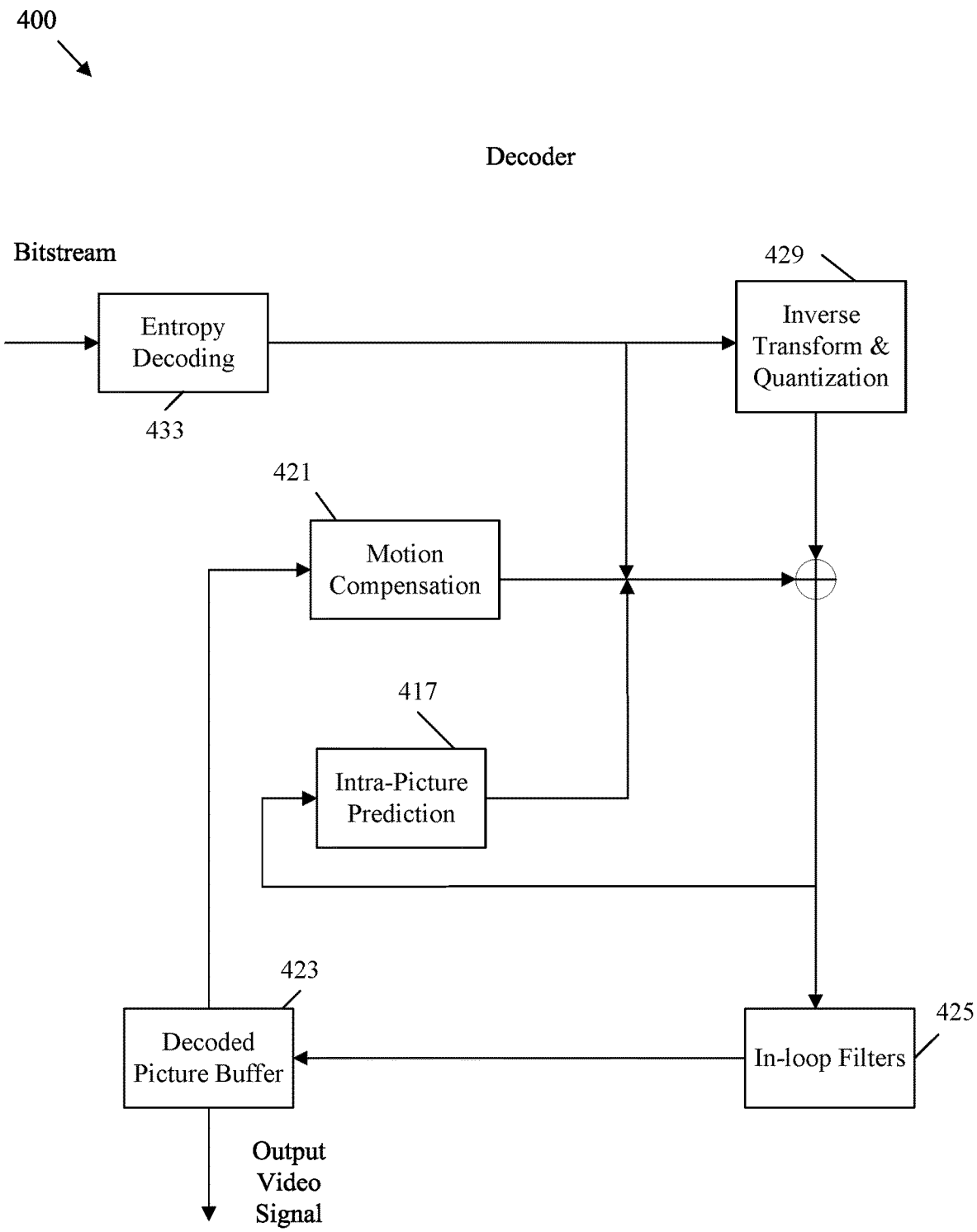
FIG. 4 is a schematic diagram illustrating an example video decoder.

FIG. 4 is a block diagram illustrating an example video decoder 400. Video decoder 400 may be employed to implement the decoding functions of codec system 200 and/or implement steps 111, 113, 115, and/or 117 of operating method 100. Decoder 400 receives a bitstream, for example from an encoder 300, and generates a reconstructed output video signal based on the bitstream for display to an end user.

The bitstream is received by an entropy decoding component 433. The entropy decoding component 433 is configured to implement an entropy decoding scheme, such as CAVLC, CABAC, SBAC, PIPE coding, or other entropy coding techniques. For example, the entropy decoding component 433 may employ header information to provide a context to interpret additional data encoded as codewords in the bitstream. The decoded information includes any desired information to decode the video signal, such as general control data, filter control data, partition information, motion data, prediction data, and quantized transform coefficients from residual blocks. The quantized transform coefficients are forwarded to an inverse transform and quantization component 429 for reconstruction into residual blocks. The inverse transform and quantization component 429 may be similar to inverse transform and quantization component 329.

The reconstructed residual blocks and/or prediction blocks are forwarded to intra-picture prediction component 417 for reconstruction into image blocks based on intra-prediction operations. The intra-picture prediction component 417 may be similar to intra-picture estimation component 215 and an intra-picture prediction component 217. Specifically, the intra-picture prediction component 417 employs prediction modes to locate a reference block in the frame and applies a residual block to the result to reconstruct intra-predicted image blocks. The reconstructed intra-predicted image blocks and/or the residual blocks and corresponding inter-prediction data are forwarded to a decoded picture buffer component 423 via an in-loop filters component 425, which may be substantially similar to decoded picture buffer component 223 and in-loop filters component 225, respectively. The in-loop filters component 425 filters the reconstructed image blocks, residual blocks and/or prediction blocks, and such information is stored in the decoded picture buffer component 423. Reconstructed image blocks from decoded picture buffer component 423 are forwarded to a motion compensation component 421 for inter-prediction. The motion compensation component 421 may be substantially similar to motion estimation component 221 and/or motion compensation component 219. Specifically, the motion compensation component 421 employs motion vectors from a reference block to generate a prediction block and applies a residual block to the result to reconstruct an image block. The resulting reconstructed blocks may also be forwarded via the in-loop filters component 425 to the decoded picture buffer component 423. The decoded picture buffer component 423 continues to store additional reconstructed image blocks, which can be reconstructed into frames via the partition information. Such frames may also be placed in a sequence. The sequence is output toward a display as a reconstructed output video signal.

Figure 5:
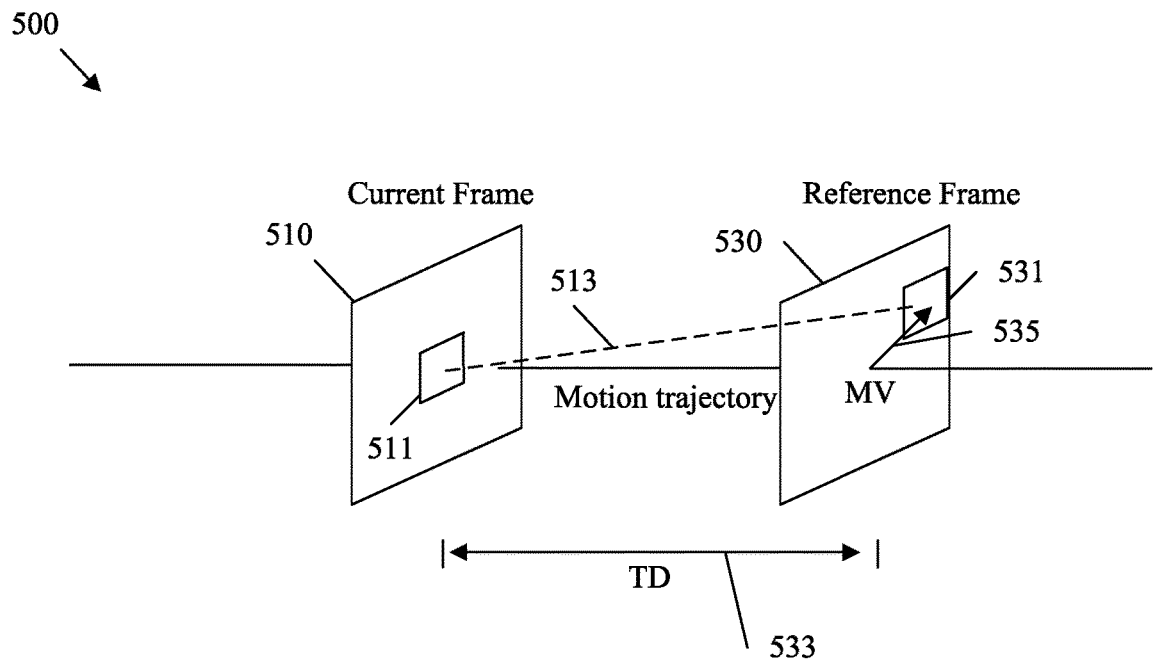
FIG. 5 is a schematic diagram illustrating an example of unidirectional inter-prediction.

FIG. 5 is a schematic diagram illustrating an example of unidirectional inter-prediction 500, for example as performed to determine motion vectors (MVs) at block compression step 105, block decoding step 113, motion estimation component 221, motion compensation component 219, motion compensation component 321, and/or motion compensation component 421.

Unidirectional inter-prediction 500 employs a reference picture 530 with a reference block 531 to predict a current block 511 in a current picture 510. The reference picture 530 may be temporally positioned after the current picture 510 as shown (e.g., as a subsequent reference picture), but may also be temporally positioned before the current picture 510 (e.g., as a preceding reference picture) in some examples. The current picture 510 is an example frame/picture being encoded/decoded at a particular time. The current picture 510 contains an object in the current block 511 that matches an object in the reference block 531 of the reference picture 530. The reference picture 530 is a picture that is employed as a reference for encoding a current picture 510, and a reference block 531 is a block in the reference picture 530 that contains an object also contained in the current block 511 of the current picture 510.

The current block 511 is any coding unit that is being encoded/decoded at a specified point in the coding process. The current block 511 may be an entire partitioned block, or may be a sub-block when employing affine inter-prediction mode. The current picture 510 is separated from the reference picture 530 by some temporal distance (TD) 533. The TD 533 indicates an amount of time between the current picture 510 and the reference picture 530 in a video sequence, and may be measured in units of pictures. The prediction information for the current block 511 may reference the reference picture 530 and/or reference block 531 by a reference index indicating the direction and temporal distance between the pictures. Over the time period represented by the TD 533, the object in the current block 511 moves from a position in the current picture 510 to another position in the reference picture 530 (e.g., the position of the reference block 531). For example, the object may move along a motion trajectory 513, which is a direction of movement of an object over time. A motion vector 535 describes the direction and magnitude of the movement of the object along the motion trajectory 513 over the TD 533. Accordingly, an encoded motion vector 535, a reference block 531, and a residual including the difference between the current block 511 and the reference block 531 provides information sufficient to reconstruct a current block 511 and position the current block 511 in the current picture 510.

Figure 6:
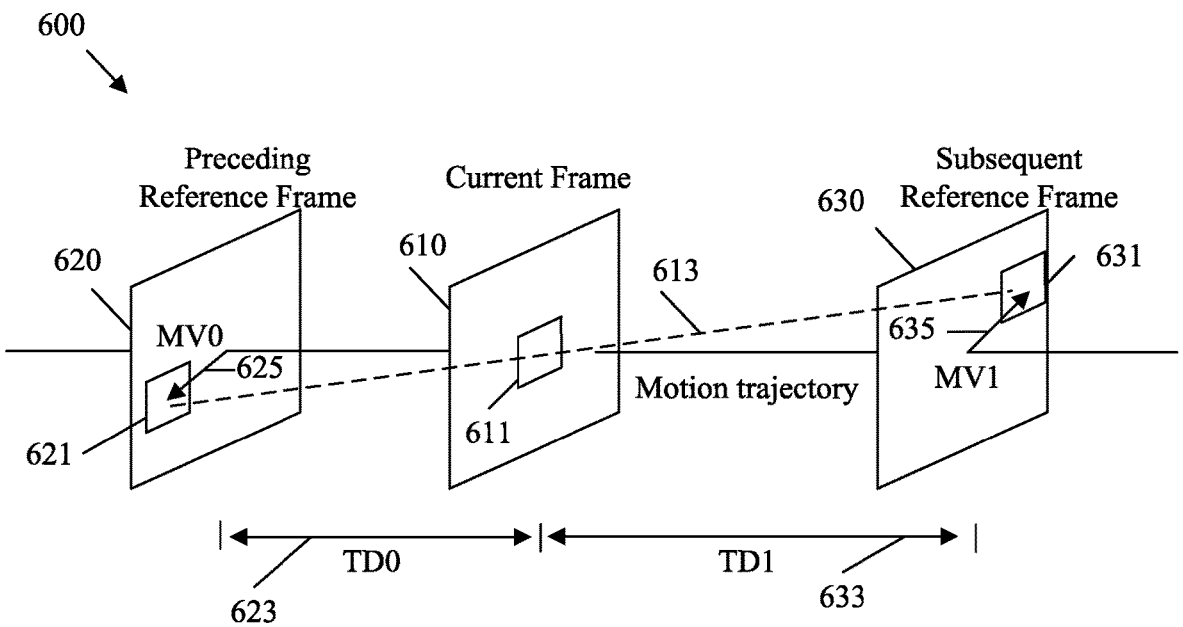
FIG. 6 is a schematic diagram illustrating an example of bidirectional inter-prediction.

FIG. 6 is a schematic diagram illustrating an example of bidirectional inter-prediction 600, for example as performed to determine MVs at block compression step 105, block decoding step 113, motion estimation component 221, motion compensation component 219, motion compensation component 321, and/or motion compensation component 421.

Bidirectional inter-prediction 600 is similar to unidirectional inter-prediction 500, but employs a pair of reference pictures to predict a current block 611 in a current picture 610. Hence current picture 610 and current block 611 are substantially similar to current picture 510 and current block 511, respectively. The current picture 610 is temporally positioned between a preceding reference picture 620, which occurs before the current picture 610 in the video sequence, and a subsequent reference picture 630, which occurs after the current picture 610 in the video sequence. Preceding reference picture 620 and subsequent reference picture 630 are otherwise substantially similar to reference picture 530.

The current block 611 is matched to a preceding reference block 621 in the preceding reference picture 620 and to a subsequent reference block 631 in the subsequent reference picture 630. Such a match indicates that, over the course of the video sequence, an object moves from a position at the preceding reference block 621 to a position at the subsequent reference block 631 along a motion trajectory 613 and via the current block 611. The current picture 610 is separated from the preceding reference picture 620 by some preceding temporal distance (TD0) 623 and separated from the subsequent reference picture 630 by some subsequent temporal distance (TD1) 633. The TD0 623 indicates an amount of time between the preceding reference picture 620 and the current picture 610 in the video sequence in units of pictures. The TD1 633 indicates an amount of time between the current picture 610 and the subsequent reference picture 630 in the video sequence in units of picture. Hence, the object moves from the preceding reference block 621 to the current block 611 along the motion trajectory 613 over a time period indicated by TD0 623. The object also moves from the current block 611 to the subsequent reference block 631 along the motion trajectory 613 over a time period indicated by TD1 633. The prediction information for the current block 611 may reference the preceding reference picture 620 and/or preceding reference block 621 and the subsequent reference picture 630 and/or subsequent reference block 631 by a pair of reference indices indicating the direction and temporal distance between the pictures.

A preceding motion vector (MV0) 625 describes the direction and magnitude of the movement of the object along the motion trajectory 613 over the TD0 623 (e.g., between the preceding reference picture 620 and the current picture 610). A subsequent motion vector (MV1) 635 describes the direction and magnitude of the movement of the object along the motion trajectory 613 over the TD1 633 (e.g., between the current picture 610 and the subsequent reference picture 630). As such, in bidirectional inter-prediction 600, the current block 611 can be coded and reconstructed by employing the preceding reference block 621 and/or the subsequent reference block 631, MV0 625, and MV1 635.

Figure 7:
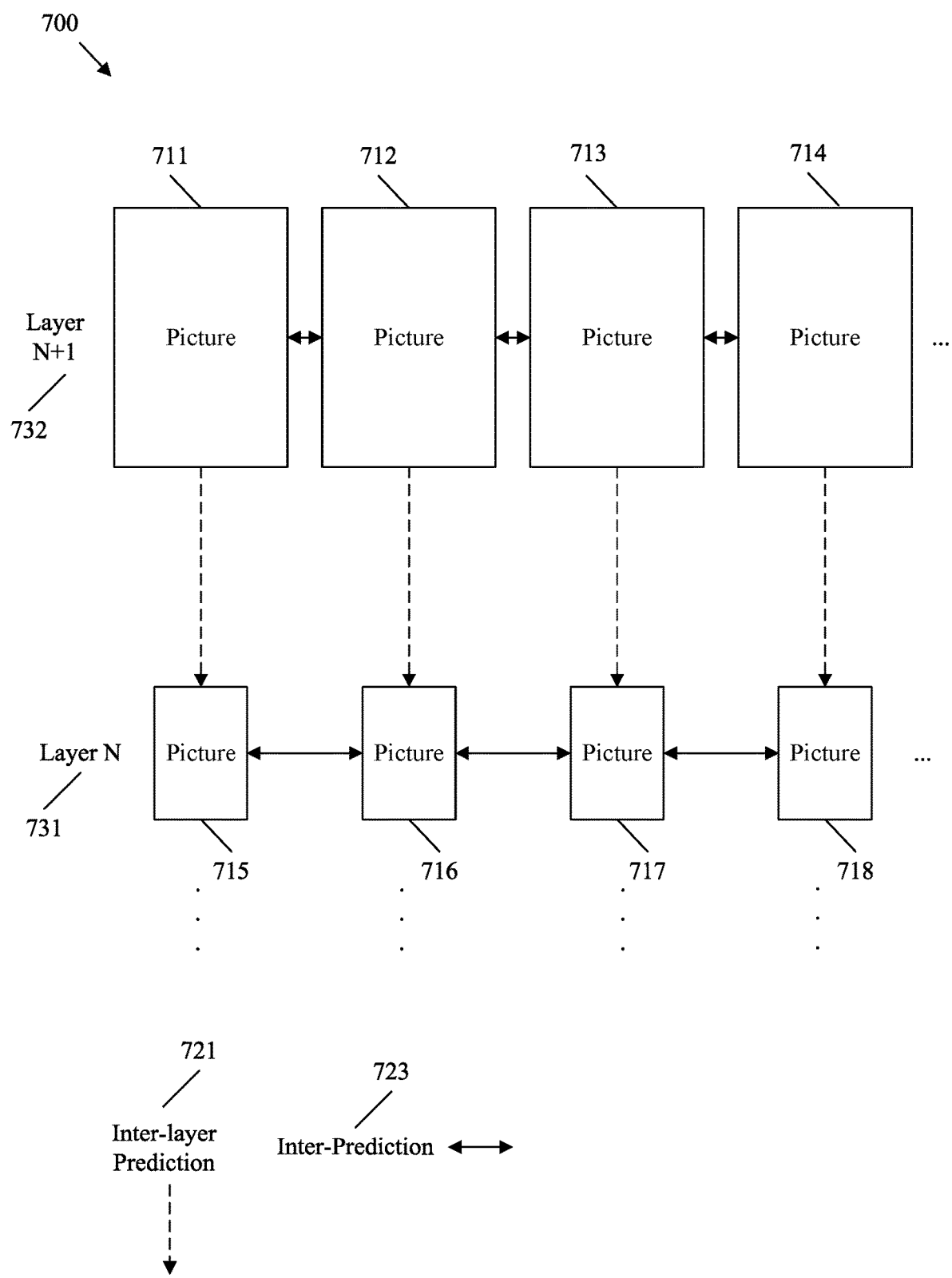
FIG. 7 is a schematic diagram illustrating an example of layer based prediction.

FIG. 7 is a schematic diagram illustrating an example of layer based prediction 700, for example as performed to determine MVs at block compression step 105, block decoding step 113, motion estimation component 221, motion compensation component 219, motion compensation component 321, and/or motion compensation component 421. Layer based prediction 700 is similar to unidirectional inter-prediction 500 and/or bidirectional inter-prediction 600, but is also performed between pictures in different layers.

Layer based prediction 700 is applied between pictures 711, 712, 713, and 714 and pictures 715, 716, 717, and 718 in different layers. In the example shown, pictures 711, 712, 713, and 714 are part of layer N+1 732 and pictures 715, 716, 717, and 718 are part of layer N 731. A layer, such as layer N 731 and/or layer N+1 732, is a group of pictures that are all associated with a similar value of a characteristic, such as a similar size, quality, resolution, signal to noise ratio, capability, etc. In the example show, layer N+1 732 is associated with a larger image size than layer N 731. Accordingly, pictures 711, 712, 713, and 714 in layer N+1 732 have a larger picture size (e.g., larger height and width and hence more samples) than pictures 715, 716, 717, and 718 in layer N 731 in this example. However, such pictures can be separated between layer N+1 732 and layer N 731 by other characteristics. While only two layers, layer N+1 732 and layer N 731, are shown, a set of pictures can be separated into any number of layers based on associated characteristics. Layer N+1 732 and layer N 731 may also be denoted by a layer ID. A layer ID is an item of data that is associated with a picture and denotes the picture is part of an indicated layer. Accordingly, each picture 711-718 may be associated with a corresponding layer ID to indicate which layer N+1 732 or layer N 731 includes the corresponding picture.

Pictures 711-718 in different layers 731-732 are configured to be displayed in the alternative. As such, pictures 711-718 in different layers 731-732 can share the same picture order count and can be included in the same AU. As used herein, an AU is a set of one or more coded pictures associated with the same display time for output from a DPB. For example, a decoder may decode and display picture 715 at a current display time if a smaller picture is desired or the decoder may decode and display picture 711 at the current display time if a larger picture is desired. As such, pictures 711-714 at higher layer N+1 732 contain substantially the same image data as corresponding pictures 715-718 at lower layer N 731 (notwithstanding the difference in picture size). Specifically, picture 711 contains substantially the same image data as picture 715, picture 712 contains substantially the same image data as picture 716, etc.

Pictures 711-718 can be coded by reference to other pictures 711-718 in the same layer N 731 or N+1 732. Coding a picture in reference to another picture in the same layer results in inter-prediction 723, which is substantially similar to unidirectional inter-prediction 500 and/or bidirectional inter-prediction 600. Inter-prediction 723 is depicted by solid line arrows. For example, picture 713 may be coded by employing inter-prediction 723 using one or two of pictures 711, 712, and/or 714 in layer N+1 732 as a reference, where one picture is referenced for unidirectional inter-prediction and/or two pictures are reference for bidirectional inter-prediction. Further, picture 717 may be coded by employing inter-prediction 723 using one or two of pictures 715, 716, and/or 718 in layer N 731 as a reference, where one picture is referenced for unidirectional inter-prediction and/or two pictures are reference for bidirectional inter-prediction. When a picture is used as a reference for another picture in the same layer when performing inter-prediction 723, the picture may be referred to as a reference picture. For example, picture 712 may be a reference picture used to code picture 713 according to inter-prediction 723. Inter-prediction 723 can also be referred to as intra-layer prediction in a multi-layer context. As such, inter-prediction 723 is a mechanism of coding samples of a current picture by reference to indicated samples in a reference picture that is different from the current picture where the reference picture and the current picture are in the same layer.

Pictures 711-718 can also be coded by reference to other pictures 711-718 in different layers. This process is known as inter-layer prediction 721, and is depicted by dashed arrows. Inter-layer prediction 721 is a mechanism of coding samples of a current picture by reference to indicated samples in a reference picture where the current picture and the reference picture are in different layers and hence have different layer IDs. For example, a picture in a lower layer N 731 can be used as a reference picture to code a corresponding picture at a higher layer N+1 732. As a specific example, picture 711 can be coded by reference to picture 715 according to inter-layer prediction 721. In such a case, the picture 715 is used as an inter-layer reference picture. An inter-layer reference picture is a reference picture used for inter-layer prediction 721. In most cases, inter-layer prediction 721 is constrained such that a current picture, such as picture 711, can only use inter-layer reference picture(s) that are included in the same AU and that are at a lower layer, such as picture 715. When multiple layers (e.g., more than two) are available, inter-layer prediction 721 can encode/decode a current picture based on multiple inter-layer reference picture(s) at lower levels than the current picture.

A video encoder can employ layer based prediction 700 to encode pictures 711-718 via many different combinations and/or permutations of inter-prediction 723 and inter-layer prediction 721. For example, picture 715 may be coded according to intra-prediction. Pictures 716-718 can then be coded according to inter-prediction 723 by using picture 715 as a reference picture. Further, picture 711 may be coded according to inter-layer prediction 721 by using picture 715 as an inter-layer reference picture. Pictures 712-714 can then be coded according to inter-prediction 723 by using picture 711 as a reference picture. As such, a reference picture can serve as both a single layer reference picture and an inter-layer reference picture for different coding mechanisms. By coding higher layer N+1 732 pictures based on lower layer N 731 pictures, the higher layer N+1 732 can avoid employing intra-prediction, which has much lower coding efficiency than inter-prediction 723 and inter-layer prediction 721. As such, the poor coding efficiency of intra-prediction can be limited to the smallest/lowest quality pictures, and hence limited to coding the smallest amount of video data. The pictures used as reference pictures and/or inter-layer reference pictures can be indicated in entries of reference picture list(s) contained in a reference picture list structure.

Figure 8:
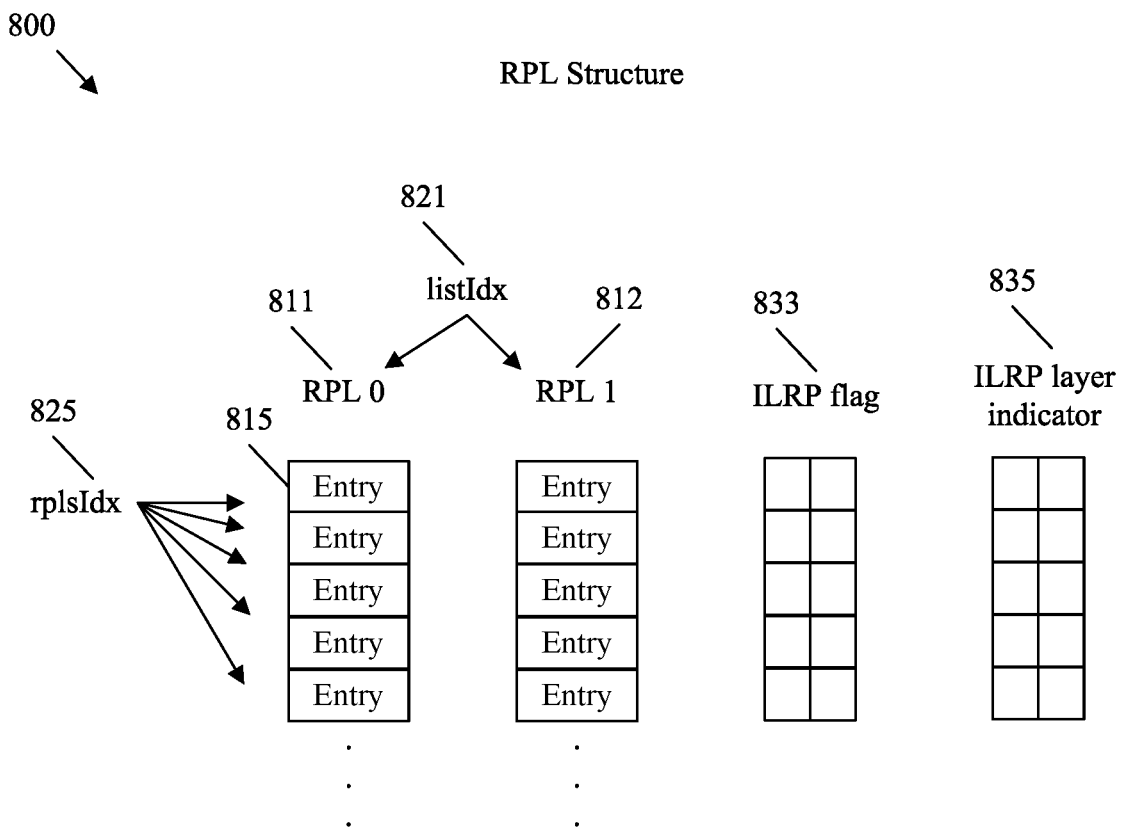
FIG. 8 is a schematic diagram illustrating an example reference picture list structure.

FIG. 8 is a schematic diagram illustrating an example reference picture list structure (RPL structure) 800. A RPL structure 800 can be employed to store indications of reference pictures and/or inter-layer reference pictures used in unidirectional inter-prediction 500, bidirectional inter-prediction 600, and/or layer based prediction 700. Hence, the RPL structure 800 can be employed by a codec system 200, an encoder 300, and/or a decoder 400 when performing method 100.

RPL structure 800 is an addressable syntax structure that contains multiple reference picture lists, such as RPL 0 811 and RPL 1 812. The RPL structure 800 may be stored in a SPS and/or a slice header of a bitstream, depending on the example. A reference picture list, such as RPL 0 811 and RPL 1 812, is a list of reference pictures used for inter-prediction and/or inter-layer prediction. RPL 0 811 and RPL 1 812 may each include a plurality of entries 815. A reference picture list structure entry 815 is an addressable location in a RPL structure 800 that indicates a reference picture associated with a reference picture list, such as RPL 0 811 and/or RPL 1 812. Each entry 815 may contain a picture order count (POC) value (or other pointer value) that references a picture used for inter-prediction. Specifically, references to pictures used by unidirectional inter-prediction 500 are stored in RPL 0 811 and references to pictures used by bidirectional inter-prediction 600 are stored in both RPL 0 811 and RPL 1 812. For example, bidirectional inter-prediction 600 may use one reference picture indicated by RPL 0 811 and one reference picture indicated by RPL 1 812.

In a specific example, the RPL structure 800 can be denoted as ref_pic_list_struct(listIdx, rplsIdx) where listIdx 821 identifies a reference picture list RPL 0 811 and/or RPL 1 812 and rplsIdx 825 identifies an entry 815 in the reference picture list. Accordingly, ref_pic_list_struct is a syntax structure that returns the entry 815 based on listIdx 821 and rplsIdx 825. An encoder can encode a portion of the RPL structure 800 for each non-intra-coded slice in a video sequence. A decoder can then resolve the corresponding portion of the RPL structure 800 before decoding each non-intra-coded slice in a coded video sequence.

As noted above, reference pictures can be referenced for inter-prediction. Further, reference pictures can be used as inter-layer reference pictures for inter-layer prediction. Accordingly, the RPL structure 800 is modified by inclusion of an ILRP flag 833 and an ILRP layer indicator 835 to support inter-layer prediction. An ILRP flag 833 is data indicating whether a picture referenced by a corresponding entry 815 of the RPL structure 800 is an inter-layer reference picture used for inter-layer prediction. Accordingly, an encoder can use the ILRP flag 833 to indicate whether each entry 815 should be treated as ILRP entry. An ILRP entry is any entry 815 that references an inter-layer reference picture used for inter-layer prediction. Further, a decoder can use the ILRP flag 833 to determine whether each entry 815 in the RPL structure 800 is an ILRP entry. In a specific example, the ILRP flag 833 is denoted as inter_layer_ref_pic_flag [listIdx][rplsIdx][i] where i is a counter variable where each value indicates a corresponding entry 815. The inter_layer_ref_pic_flag[listIdx][rplsIdx][i] can be set equal to one when an i-th entry in the ref_pic_list_struct(listIdx, rplsIdx) is an ILRP entry. Further, the inter_layer_ref_pic_flag[listIdx][rplsIdx][i] can be set equal to zero when the i-th entry in the ref_pic_list_struct(listIdx, rplsIdx) is not the ILRP entry.

As noted above, an inter-layer reference picture may be located in the same AU and have the same POC value as the current picture being encoded/decoded. As such, the RPL structure 800 may not be modified to add a POC value of a corresponding inter-layer reference picture. However, a decoder may be unable to infer which layer or layers of an AU include the appropriate inter-layer reference picture(s) to decode a current picture. The ILRP layer indicator 835 is included for this purpose. An ILRP layer indicator 835 is data that indicates a layer associated with an inter-layer reference picture that is referenced by a current picture. Specifically, the ILRP layer indicator 835 can indicate one or more layers for each entry 815 that is an ILRP entry as denoted by the ILRP flag 833. As such, an encoder can encode an ILRP layer indicator 835 into a bitstream to indicate a layer of one or more inter-layer reference pictures associated with an entry 815. In addition, a decoder can determine a layer of inter-layer reference picture(s) based on the ILRP layer indicator 835 when the entry 815 is an ILRP entry as indicated by the ILRP flag 833. As such, the addition of the ILRP flag 833 and the ILRP layer indicator 835 to the RPL structure 800 provides sufficient information to allow the RPL structure 800 to manage reference pictures for inter-layer prediction.

Figure 9:
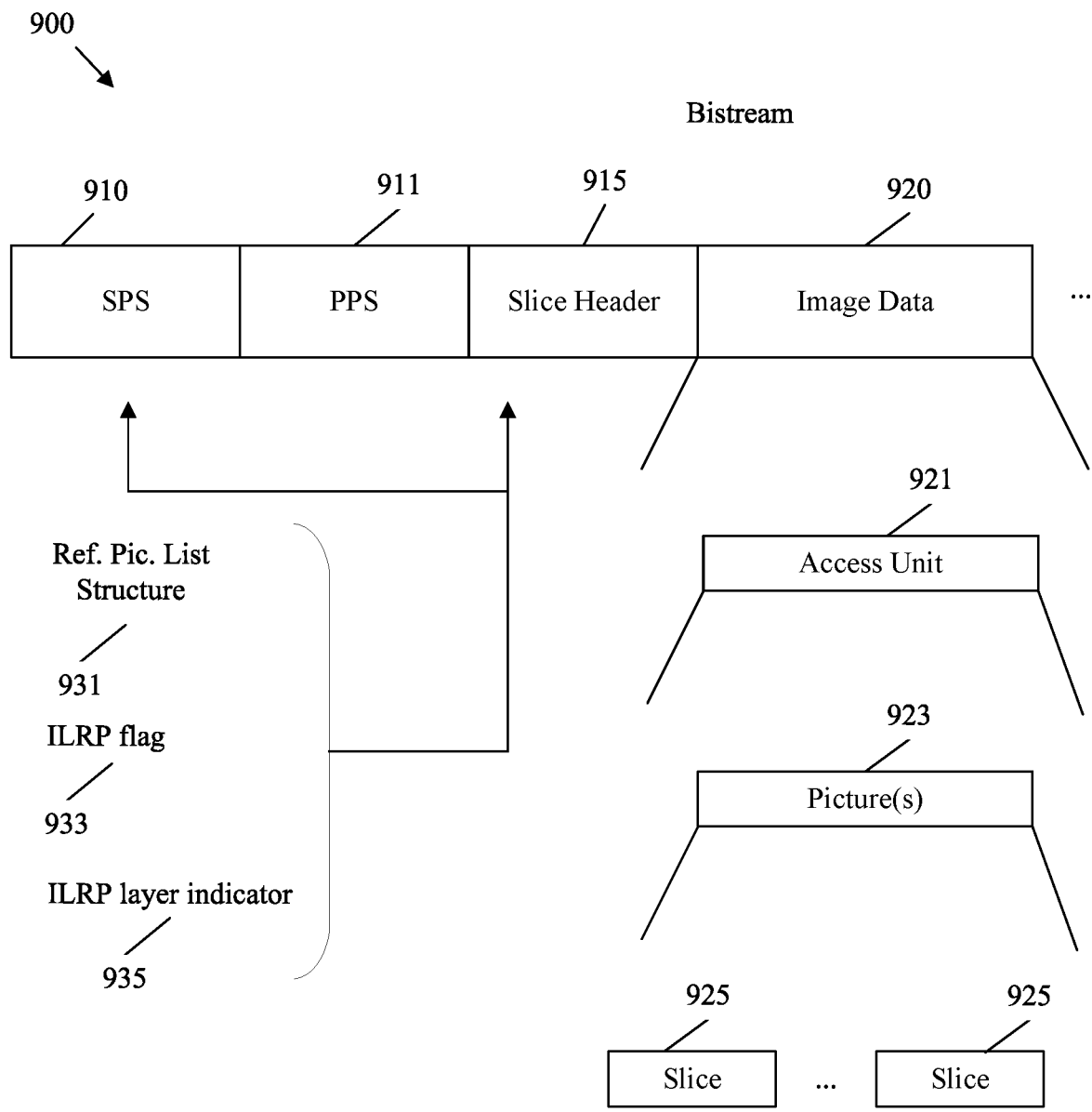
FIG. 9 is a schematic diagram illustrating an example bitstream containing coding tool parameters to support inter-layer prediction.

FIG. 9 is a schematic diagram illustrating an example bitstream 900 containing coding tool parameters to support inter-layer prediction. For example, the bitstream 900 can be generated by a codec system 200 and/or an encoder 300 for decoding by a codec system 200 and/or a decoder 400. As another example, the bitstream 900 may be generated by an encoder at step 109 of method 100 for use by a decoder at step 111. Further, the bitstream 900 may a coded video sequence, which may be coded according to unidirectional inter-prediction 500, bidirectional inter-prediction 600, and/or layer based prediction 700. In addition, bitstream 900 can be employed to communicate a RPL structure 800.

The bitstream 900 includes a sequence parameter set (SPS) 910, a plurality of picture parameter sets (PPSs) 911, a plurality of slice headers 915, and image data 920. An SPS 910 contains sequence data common to all the pictures in the video sequence contained in the bitstream 900. Such data can include picture sizing, bit depth, coding tool parameters, bit rate restrictions, etc. The PPS 911 contains parameters that apply to an entire picture. Hence, each picture in the video sequence may refer to a PPS 911. It should be noted that, while each picture refers to a PPS 911, a single PPS 911 can contain data for multiple pictures in some examples. For example, multiple similar pictures may be coded according to similar parameters. In such a case, a single PPS 911 may contain data for such similar pictures. The PPS 911 can indicate coding tools available for slices in corresponding pictures, quantization parameters, offsets, etc. The slice header 915 contains parameters that are specific to each slice in a picture. Hence, there may be one slice header 915 per slice in the video sequence. The slice header 915 may contain slice type information, picture order counts (POCs), reference picture lists, prediction weights, tile entry points, deblocking parameters, etc. It should be noted that a slice header 915 may also be referred to as a tile group header in some contexts. It should be noted that in some examples, a bitstream 900 may also include a picture header, which is a syntax structure that contains parameters that apply to all slices in a single picture. For this reason, a picture header and a slice header 915 may be used interchangably in some contexts. For example, certain parameters may be moved between the slice header 915 and a picture header depending on whether such parameters are common to all slices in a picture.

The image data 920 contains video data encoded according to inter-prediction, intra-prediction, and/or inter-layer prediction as well as corresponding transformed and quantized residual data. For example, a video sequence includes a plurality of pictures 923. A picture 923 is an array of luma samples and/or an array of chroma samples that create a frame or a field thereof. A frame is a complete image that is intended for complete or partial display to a user at a corresponding instant in a video sequence. A picture 923 may be contained in a single AU 921. An AU 921 is a coding unit configured to store all coded picture(s) 923 with the same picture order count and optionally one or more headers, such as slice headers 915, containing parameters describing the coding mechanisms employed to code the coded picture(s) 923. Accordingly, an AU 921 can contain a single picture 923 for each picture level contained in the bitstream 900. A picture 923 contains one or more slices 925. A slice 925 may be defined as an integer number of complete tiles or an integer number of consecutive complete CTU rows (e.g., within a tile) of a picture 923 that are exclusively contained in a single NAL unit. The slices 925 are further divided into CTUs and/or coding tree blocks (CTBs). A CTU is a group of samples of a predefined size that can be partitioned by a coding tree. A CTB is a subset of a CTU and contains luma components or chroma components of the CTU. The CTUs/CTBs are further divided into coding blocks based on coding trees. The coding blocks can then be encoded/decoded according to prediction mechanisms.

The bitstream 900 contains various coding tool parameters to support inter-layer prediction. Specifically, the bitstream includes a reference picture list structure 931, an ILRP flag 933, and an ILRP layer indicator 935, which may be substantially similar to the RPL structure 800, the ILRP flag 833, and the ILRP layer indicator 835, respectively. The reference picture list structure 931, the ILRP flag 933, and the ILRP layer indicator 935 may be coded into the SPS 910, the slice header 915, and/or a corresponding picture header. As such, an encoder can list reference pictures in entries in the reference picture list structure 931, indicate which of the reference pictures are inter-layer reference pictures in the ILRP flag 933, and indicate which layer contains the relevant inter-layer reference pictures in the ILRP layer indicator 935. Further, a decoder can decode the SPS 910, the slice header 915, and/or a corresponding picture header to obtain the reference picture list structure 931, the ILRP flag 933, and the ILRP layer indicator 935. The decoder can then determine the reference pictures for a current picture from the entries in the reference picture list structure 931. The decoder can also determine which of the reference pictures are inter-layer reference pictures by employing the ILRP flag 933. Further, the decoder can determine one or more levels associated with the inter-layer reference pictures by employing the ILRP layer indicator 935. As such, the bitstream 900 is configured to provide sufficient information to manage reference pictures when performing combinations of intra-prediction, inter-prediction, and/or inter-layer prediction to code a video sequence.

The preceding information is now described in more detail herein below. A reference picture resampling (RPR) mechanism may be employed to change the spatial resolution of coded pictures in the middle of a bitstream. This resolution change can be accomplished at a current picture even when the current picture has not been intra-coded. To enable this feature, a current picture may refer to one or more reference pictures for inter-prediction purposes where the reference pictures employ a spatial resolution that is different from the spatial resolution of the current picture. Consequently, encoding and decoding of the current picture may involve resampling of such a reference picture, or parts thereof. This feature may also be referred to as adaptive resolution change (ARC). Resampling of a reference picture can be realized at either the picture level or the coding block level.

Several implementations may benefit from RPR. For example, video telephony and conferencing may employ rate adaption. The rate of the coded video can be adapted to the changing network conditions. When network conditions deteriorate and available bandwidth becomes lower, the encoder may adapt by encoding pictures at smaller resolution pictures. As another example, active speaker changes in multi-party video conferencing may benefit from RPR. In multi-party video conferencing, an active speaker may be shown in bigger video size than the video for the rest of conference participants. When the active speaker changes, the picture resolution for each participant may also be adjusted. The RPR/ARC mechanism is progressively more beneficial when the active speaker changes more frequently. In another example, fast start in streaming may benefit from RPR. Streaming applications may buffer up to a certain length of decoded pictures before beginning to display. Initiating the bitstream with smaller resolutions may allow the application to buffer enough pictures to start displaying faster. The resolution can then be increased once display has begun. In another example, adaptive stream switching in streaming may benefit from RPR. Dynamic Adaptive Streaming over HTTP (DASH) employs a feature named @mediaStreamStructureId. This feature enables switching between different representations at open-group of picture (GOP) random access points with non-decodable leading pictures, which may be referred to as a clean random access (CRA) picture with associated RASL pictures in HEVC. For example, two different representations of the same video may have different bitrates and the same spatial resolution while they have the same value of @mediaStreamStructureId. In such a case, switching between the two representations at a CRA picture with associated RASL pictures can be performed. The RASL pictures associated with the CRA picture can be decoded with acceptable quality, which enables seamless switching. ARC/RPR allows the @mediaStreamStructureId feature to be employed when switching between DASH representations with different spatial resolutions.

ARC/RPR may be implemented by employing layered video coding, which may also be referred to as scalable video coding and/or video coding with scalability. Scalability in video coding may be supported by using multi-layer coding techniques. A multi-layer bitstream comprises a base layer (BL) and one or more enhancement layers (ELs). Scalabilities may include spatial scalability, quality/signal to noise ratio (SNR) scalability, multi-view scalability, etc. When a multi-layer coding technique is employed, a picture (or part thereof) may be coded (1) without using a reference picture (intra-prediction); (2) by reference to one or more reference pictures that are in the same layer (inter-prediction); or (3) by reference to one or more reference pictures that are in other layer(s) (inter-layer prediction). A reference picture used for inter-layer prediction of the current picture is referred to as an inter-layer reference picture (ILRP).

H.26x video coding families may provide support for scalability in separated profile(s) from the profile(s) for single-layer coding. Scalable video coding (SVC) is a scalable extension of AVC/H.264 that provides supports for spatial, temporal, and quality scalabilities. For SVC, a flag is signaled in each macroblock (MB) in pictures to indicate whether the MB is predicted using the collocated block from a lower layer. The prediction from the collocated block may include texture, motion vectors, and/or coding modes.

Scalable HEVC (SHVC) is the extension of HEVC/H.265 that provides support for spatial and quality scalabilities. Multiview HEVC (MV-HEVC) is the extension of HEVC/H.265 that provides support for multi-view scalability. Three dimensional (3D) HEVC (3D-HEVC) is an extension of HEVC/H.264 that provides supports for 3D video coding. Temporal scalability may be employed in a single-layer HEVC codec. A multi-layer extension of HEVC employs a mechanism where the decoded pictures used for inter-layer prediction are taken only from the same AU and are treated as long-term reference pictures (LTRPs). Such pictures are assigned reference indices in the reference picture list(s) along with other temporal reference pictures in the current layer. Inter-layer prediction (ILP) is achieved at the prediction unit (PU) level by setting the value of the reference index to refer to the inter-layer reference picture(s) in the reference picture list(s).

Spatial scalability may employ resampling of a reference picture or part thereof when an ILRP has different spatial resolution than the current picture being encoded or decoded. Reference picture resampling can be realized at either picture level or coding block level.

In video codec specifications, pictures may be identified for multiple purposes. For example, the pictures may be identified for use as a reference picture in inter-prediction, for output from the DPB, for scaling of motion vectors, for weighted prediction, etc. In some video coding systems, pictures can be identified by picture order count (POC). Further, pictures in the DPB can be marked as used for short-term reference, used for long-term reference, or unused for reference. A picture can no longer be used for prediction once that picture has been marked unused for reference. When such a picture is no longer needed for output, that picture can be removed from the DPB.

AVC may employ short-term and long-term reference pictures. A reference picture may be marked as unused for reference when the picture is no longer needed as a prediction reference. The conversion among these three statuses (short-term, long-term, and unused for reference) is controlled by the decoded reference picture marking process. An implicit sliding window process and an explicit memory management control operation (MMCO) process may be employed for reference picture marking in such systems. The sliding window process marks a short-term reference picture as unused for reference when the number of reference frames is equal to a maximum number (max_num_ref_frames) in the SPS. The short-term reference pictures are stored in a first-in, first-out manner so that the most recently decoded short-term pictures are kept in the DPB. The explicit MMCO process may include multiple MMCO commands. An MMCO command may mark one or more short-term or long-term reference picture as unused for reference, mark all the pictures as unused for reference, or mark the current reference picture or an existing short-term reference picture as long-term and assign a long-term picture index to that long-term reference picture. In AVC the reference picture marking operations as well as the processes for output and removal of pictures from the DPB are performed after a picture has been decoded.

HEVC employs a reference picture set (RPS) for reference picture marking. When employing the RPS, a complete set of the reference pictures that are used by the current picture or any subsequent picture is provided for each slice. Thus, a complete set of all pictures that should be kept in the DPB for use by the current or future pictures is signaled in the RPS. This is different from the AVC scheme where only relative changes to the DPB are signaled. The RPS may not store information from earlier pictures in decoding order when maintaining the correct status of reference pictures in the DPB.

In AVC picture marking and buffer operations (both output and removal of decoded pictures from the DPB) may be applied after a current picture has been decoded. In HEVC, the RPS is first decoded from a slice header of the current picture. Then picture marking and buffer operations may be applied before decoding the current picture.

VVC employs a reference picture list zero and reference picture list one for reference picture management. With that approach, reference picture lists for a picture are directly constructed without using a reference picture list initialization process and a reference picture list modification process. Furthermore, reference picture marking is performed directly based on the two reference picture lists.

The preceding systems have certain problems. A VVC decoder should be able to derive an inter-layer reference picture to enable a multi-layer video codec with inter-layer prediction. In order to implement such a mechanism, the codec should employ a mechanism for signaling of RPLs, deriving of RPLs, and performing reference picture marking in a multi-layer context.

The present disclosure includes some approaches for reference picture management in layered video coding. This includes signaling of RPLs, deriving of RPLs, and reference picture marking. The descriptions of the techniques are based on VVC, but apply to other layered video coding specifications. For example, the present disclosure includes mechanisms for signaling of RPLs in a multi-layer video codec with inter-layer prediction based on VVC. The following constraints may apply to the examples described below. All VCL NAL units having the same layer ID and associated with the same presentation time may comprise one picture. Further, all VCL NAL units within a picture may have the same POC value. Such a POC value may also be referred to as the POC value of the picture.

A first example is summarized as follows. All pictures associated with the same presentation time belong to one access unit. Pictures of different layers and within the same access unit have the same POC value. A first flag, such as an inter_layer_ref_pics_flag, can be added to the SPS to specify whether ILRP is used for inter-prediction of any coded picture in the CVS. When the first flag specifies that ILRPs may be used for inter-prediction of one or more coded pictures in the CVS, a second flag can be signaled for each entry in an RPL structure in order to specify whether the entry is an ILRP entry. When the second flag for an entry specifies that the entry is an ILRP entry, a first delta value that specifies the difference between the layer ID of the current picture and the picture referred to by the entry minus one can be signaled. In some examples, the first delta value specifies the difference between the layer index of the layer containing the current picture and the layer index of the layer containing the picture referred to by the entry minus one. At the beginning of decoding a current slice, the RPLs can be constructed by the decoder according to RPL signaling in the bitstream. When an entry is an ILRP entry, the entry is derived to refer to the picture having the same PicOrderCntVal as the current picture and having layer ID equal to the layer ID of the current picture minus the first delta value minus one. At the beginning of decoding a current picture, each ILRP (if present) is marked as used for long-term reference. At the end of decoding a current picture, each ILRP (if present) is marked as used for short-term reference. A decoded picture may only be marked as unused for reference when decoding a picture of the same layer.

A method of performing the abovementioned example is as follows. In an example, a method for decoding a video bitstream is disclosed. The bitstream comprises a plurality of layers with each layer comprising a plurality of pictures. One or more of the pictures belong to different layers and have the same presentation time, and hence form one access unit. The method comprises deriving a POC value for each picture. The POC values of all pictures within one access unit are the same. A number of RPLs are derived for the current slice. Each entry is associated with a flag specifying whether the entry is an ILRP entry. The current slice is decoded based on the derived RPLs. In an example aspect, the bitstream includes a SPS flag that specifies whether the ILRP entry is used for inter-prediction of any coded picture in the CVS. In an example aspect, when an entry in an RPL is specified to be an ILRP entry, the bitstream includes a first delta value that specifies the difference between the layer ID of a current picture containing the current slice and the picture referred to by the entry minus one. In an example aspect, the ILRP entry refers to the picture having the same PicOrderCntVal as the current picture and having layer ID equal to the layer ID of the current picture minus the first delta value minus one. In an example aspect, at the beginning of decoding a current picture, each ILRP (if present) is marked as used for long-term reference. At the end of decoding a current picture, each ILRP (if present) is marked as used for short-term reference.

A second method of performing the abovementioned example is as follows. In an example, all pictures associated with the same presentation time belong to one access unit. Each picture may be associated with an intra-layer POC value and a cross-layer POC value. Pictures within one CVS may have different cross-layer POC values. Pictures of different layers and within the same access unit may have the same intra-layer POC value but may have different cross-layer POC values. Any picture may not refer to a picture of a higher layer and hence may not refer to a picture with a greater value of layer ID. A decoded picture may only be marked as unused for reference when decoding of a picture of the same layer.

A third method of performing the abovementioned example is as follows. In an example, all pictures associated with the same presentation time belong to one access unit. Pictures within a CVS may have different POC values. Pictures within one CVS may be identified by POC values only. Any picture may not refer to a picture of a higher layer and hence may not refer to a picture with a greater value of layer ID. A decoded picture may only be marked as unused for reference when decoding a picture of the same layer.

A fourth method of performing the abovementioned example is as follows. Each access unit may contain only one picture. Accordingly, any two pictures associated with the same presentation time but belonging to different layers may belong to two different access units. Pictures within one CVS may have different POC values. Pictures within one CVS may be identified by POC values only. Any picture may not refer to a picture of a higher layer and hence may not refer to a picture with a greater value of layer ID. A reference picture may be marked as unused for reference regardless of whether the current picture and the reference picture belong to the same layer or not.

A first example implementation of the abovementioned methods is described below. Example definitions are as follows. An ILRP is a picture in the same access unit with the current picture and has nuh_layer_id that is less than nuh_layer_id of the current picture and is marked as used for long-term reference. A long-term reference picture (LTRP) is a picture with nuh_layer_id equal to nuh_layer_id of the current picture and that is marked as used for long-term reference. A reference picture is a picture that is a short-term reference picture or a long-term reference picture, or an inter-layer reference picture. A reference picture contains samples that may be used for inter-prediction in the decoding process of subsequent pictures in decoding order. A short-term reference picture (STRP) is a picture with nuh_layer_id equal to nuh_layer_id of the current picture and that is marked as used for short-term reference.

An example sequence parameter set RBSP syntax is as follows.

|  | Descriptor |
|---|---|
| seq_parameter_set_rbsp( ) { | |
| ... | |
| long_term_ref_pics_flag | u(1) |
| inter_layer_ref_pics_flag | u(1) |
| ... | |
| } | |

An example reference picture list structure syntax is as follows.

|  | Descriptor |
|---|---|
| ref_pic_list_struct( listIdx, rplsIdx ) { | |
|   num_ref_entries[ listIdx ][ rplsIdx ] | ue(v) |
|   if( long_term_ref_pics_flag ) | |
|     ltrp_in_slice_header_flag[ listIdx ][ rplsIdx ] | u(1) |
|   for( i = 0, j = 0; i < num_ref_entries[ listIdx ][ rplsIdx ]; i++) { | |
|     if( inter_layer_ref_pics_flag ) | |
|       inter_layer_ref_pic_flag[ listIdx ][ rplsIdx ][ i ] | u(1) |
|     if( !inter_layer_ref_pic_flag[ listIdx ][ rplsIdx ][ i ] ) { | |
|       if( long_term_ref_pics_flag ) | |

-continued

| | Descriptor |
|---|---|
| st_ref_pic_flag[ listIdx ][ rplsIdx ][ i ]<br>if( st_ref_pic_flag[ listIdx ][ rplsIdx ][ i ] ) { | u(1) |
|     abs_delta_poc_st[ listIdx ][ rplsIdx ][ i ]<br>    if( abs_delta_poc_st[ listIdx ][ rplsIdx ][ i ] > 0 ) | ue(v) |
|         strp_entry_sign_flag[ listIdx ][ rplsIdx ][ i ]<br>} else if( !ltrp_in_slice_header_flag[ listIdx ]<br>[ rplsIdx ] ) | u(1) |
|     rpls_poc_lsb_lt[ listIdx ][ rplsIdx ][ j++ ]<br>} else | u(v) |
|     rpls_entry_layer_id_delta_minus1[ listIdx ]<br>[ rplsIdx ][ i ]<br>}<br>} | ue(v) |

An example sequence parameter set RBSP semantics are as follows. A long_term_ref_pics_flag may be set equal to zero to specify that no LTRP is used for inter-prediction of any coded picture in the CVS. The long_term_ref_pics_flag may be set equal to one to specify that LTRPs may be used for inter-prediction of one or more coded pictures in the CVS. An inter_layer_ref_pics_flag may be set equal to zero to specify that no ILRP is used for inter-prediction of any coded picture in the CVS. The inter_layer_ref_pics_flag may be set equal to one to specify that ILRPs may be used for inter-prediction of one or more coded pictures in the CVS.

An example general slice header semantics is as follows. A slice_type specifies the coding type of the slice according to the following table.

TABLE 7-4

Name association to slice_type

| slice_type | Name of slice_type |
|---|---|
| 0 | B (B slice) |
| 1 | P (P slice) |
| 2 | I (I slice) |

When NalUnitType is a value of NalUnitType in the range of IDR_W_RADL to CRA_NUT, inclusive, and the current picture is the first picture in an access unit, slice_type should be equal to two.

An example reference picture list structure semantics is as follows. An inter_layer_ref_pic_flag[listIdx][rplsIdx][i] may be set equal to one to specify that the i-th entry in the ref_pic_list_struct(listIdx, rplsIdx) syntax structure is an ILRP entry. inter_layer_ref_pic_flag[listIdx][rplsIdx][i] may be set equal to zero to specify that the i-th entry in the ref_pic_list_struct(listIdx, rplsIdx) syntax structure is not an ILRP entry. When not present, the value of inter_layer_ref_pic_flag[listIdx][rplsIdx][i] is inferred to be equal to zero. A st_ref_pic_flag[listIdx][rplsIdx][i] may be set equal to one to specify that the i-th entry in the ref_pic_list_struct(listIdx, rplsIdx) syntax structure is an STRP entry. The st_ref_pic_flag[listIdx][rplsIdx][i] may be set equal to zero to specify that the i-th entry in the ref_pic_list_struct (listIdx, rplsIdx) syntax structure is an LTRP entry. When inter_layer_ref_pic_flag[listIdx][rplsIdx][i] is equal to zero and st_ref_pic_flag[listIdx][rplsIdx][i] is not present, the value of st_ref_pic_flag[listIdx][rplsIdx][i] can be inferred to be equal to one.

The variable NumLhpEntries[listIdx][rplsIdx] may be derived as follows:
For (i=0, NumLhpEntries[listIdx][rplsIdx]=0; i<num_ref_entries[listIdx][rplsIdx]; i++)
    if(!inter_layer_ref_pic_flag[listIdx][rplsIdx][i]&&
    !st_ref_pic_flag[listIdx][rplsIdx][i])
        NumLtrpEntries[listIdx][rplsIdx]++

A shp_entry_sign_flag[listIdx][rplsIdx][i] may be set equal to one to specify that i-th entry in the syntax structure ref_pic_list_struct(listIdx, rplsIdx) has a value greater than or equal to 0. The strp_entry_sign_flag[listIdx][rplsIdx][i] may be set equal to zero to specify that the i-th entry in the syntax structure ref_pic_list_struct(listIdx, rplsIdx) has a value less than zero. When not present, the value of strp_entry_sign_flag[listIdx][rplsIdx][i] may be inferred to be equal to one.

The list DeltaPocSt[listIdx][rplsIdx] may be derived as follows:
for(i=0; i<num_ref_entries[listIdx][rplsIdx]; i++)
    if(!inter_layer_ref_pic_flag[listIdx][rplsIdx][i]
    && st_ref_pic_flag[listIdx][rplsIdx][i]) {(7-93)
    DeltaPocSt[listIdx][rplsIdx][i]=(strp_entry_sign_flag
    [listIdx][rplsIdx][i])
?
    abs_delta_poc_st[listIdx][rplsIdx][i]:0−abs_
    delta_poc_st[listIdx][rplsIdx][i]

An rpls_entry_layer_id_delta_minus1[listIdx][rplsIdx][i] plus one specifies the difference between the nuh_layer_id of the current picture and the picture referred to by the i-th entry. The value of rpls_entry_layer_id_delta_minus1[listIdx][rplsIdx][i] may be in the range of zero to one hundred twenty five, inclusive.

An example decoding process for a coded picture is as follows. The decoding process operates as follows for the current picture CurrPic. NAL units are decoded. The following decoding processes may use syntax from the following elements in the slice header layer and above. Variables and functions relating to picture order count are derived. This may be invoked only for the first slice of a picture. At the beginning of the decoding process for each slice of a non-instantaneous decoding refresh (IDR) picture, the decoding process for reference picture lists construction may be invoked for derivation of reference picture list 0 (RefPicList[0]) and reference picture list 1 (RefPicList[1]). The decoding process for reference picture marking is invoked, wherein reference pictures may be marked as unused for reference or used for long-term reference. This may be invoked only for the first slice of a picture. When the current picture is a CRA picture with NoIncorrectPicOutputFlag equal to one or Gradual Random Access (GRA) picture with NoIncorrectPicOutputFlag equal to 1, the decoding process for generating unavailable reference pictures is invoked, which may be invoked only for the first slice of a picture. A PictureOutputFlag may be set as follows. If one of the following conditions is true, the PictureOutputFlag may be set equal to zero. When the current picture is a RASL picture and NoIncorrectPicOutputFlag of the associated IRAP picture is equal to one, the PictureOutputFlag may be set equal to zero. When the gra_enabled_flag is equal to one and the current picture is a GRA picture with NoIncorrectPicOutputFlag equal to one, the PictureOutputFlag may be set equal to zero. When the gra_enabled_flag is equal to one, the current picture is associated with a GRA picture with NoIncorrectPicOutputFlag equal to one, and PicOrderCntVal of the current picture is less than RpPicOrderCntVal of the associated GRA picture, the PictureOutputFlag may be set equal to zero. Otherwise, PictureOutputFlag is set equal to one. After all slices of the current picture have been decoded, the current decoded picture is marked as used for short-term reference, and each ILRP entry in RefPicList[0] or RefPicList[1] is marked as used for short-term reference.

The reference picture lists RefPicList[0] and RefPicList[1] may be constructed as follows.

```
for( i = 0; i <2; i++ ) {
    for(j = 0, k = 0, pocBase = PicOrderCntVal; j <
num_ref_entries[ i ][ RplsIdx[ i ] ]; j++) {
        if( !inter_layer_ref_pic_flag[ i ][ RplsIdx[ i ] ][ j ] ) {
            if( st_ref_pic_flag[ i ][RplsIdx[ i ] ][ j ] ) {
                RefPicPocList[ i ][ j ] = pocBase − DeltaPocSt[ i ][ RplsIdx[ i ] ][ j ]
                if( there is a reference picture picA in the DPB with the same
nuh_layer_id as the current picture and PicOrderCntVal equal to RefPicPocList[ i ][ j ] )
RefPicList[ i ][ j ] = picA
                else
                    RefPicList[ i ][ j ] = "no reference picture"                    (8-5)
                pocBase = RefPicPocList[ i ][ j ]
            } else {
                if( !delta_poc_msb_cycle_lt[ i ][ k ] ) }
                    if( there is a reference picA in the DPB with the same nuh_layer_id as
the current picture and PicOrderCntVal & ( MaxPicOrderCntLsb − 1 ) equal to
PocLsbLt[ i ][ k ])
                        RefPicList[ i ][ j ] = picA
                    else
                        RefPicList[ i ][ j ] = "no reference picture"
                } else {
                    if( there is a reference picA in the DPB with the same nuh_layer_id as
the current picture and PicOrderCntVal equal to FullPocLt[ i ][ k ] )
                        RefPicList[ i ][ j ] = picA
                    else
                        RefPicList[ i ][ j ] = "no reference picture"
                }
                k++
            }
        } else {
            refPicLayerId =
nuh_layer_id − rpls_entry_layer_id_delta_minus1[ i ][ RplsIdx[ i ] ][ j ] − 1
            if( there is a reference picture picA in the DPB with nuh_layer_id equal to
refPicLayerId and the same PicOrderCntVal as the current picture )
                RefPicList[ i ][ j ] = picA
            else
                RefPicList[ i ][ j ] = "no reference picture"
        }
    }
}
```

An example decoding process for reference picture lists construction is as follows. This process is invoked at the beginning of the decoding process for each slice of a non-IDR picture. Reference pictures are addressed through reference indices. A reference index is an index into a reference picture list. When decoding an intra-coding (I) slice, no reference picture list is used in decoding of the slice data. When decoding a unidirectional inter-prediction (P) slice, only reference picture list zero (RefPicList[0]), is used in decoding of the slice data. When decoding a bidirectional inter-prediction (B) slice, both reference picture list zero and reference picture list one (RefPicList[1]) are used in decoding of the slice data. At the beginning of the decoding process for each slice of a non-IDR picture, the reference picture lists RefPicList[0] and RefPicList[1] are derived. The reference picture lists are used in marking of reference pictures or in decoding of the slice data. For an I slice of a non-IDR picture that it is not the first slice of the picture, RefPicList[0] and RefPicList[1] may be derived for bitstream conformance checking purpose, but their derivation may not be necessary for decoding of the current picture or pictures following the current picture in decoding order. For a P slice that is not the first slice of a picture, RefPicList[1] may be derived for bitstream conformance checking purpose, but may not be necessary for decoding of the current picture or pictures following the current picture in decoding order.

For each i equal to zero or one, the first NumRefIdxActive[i] entries in RefPicList[i] are referred to as the active entries in RefPicList[i], and the other entries in RefPicList[i] are referred to as the inactive entries in RefPicList[i]. It is possible that a particular picture is referred to by both an entry in RefPicList[0] and an entry in RefPicList[1]. It is also possible that a particular picture is referred to by more than one entry in RefPicList[0] or by more than one entry in RefPicList[1]. The active entries in RefPicList[0] and the active entries in RefPicList[1] collectively refer to all reference pictures that may be used for inter-prediction of the current picture and one or more pictures that follow the current picture in decoding order. The inactive entries in RefPicList[0] and the inactive entries in RefPicList[1] collectively refer to all reference pictures that are not used for inter-prediction of the current picture but may be used in inter-prediction for one or more pictures that follow the current picture in decoding order. There may be one or more entries in RefPicList[0] or RefPicList[1] that are equal to no reference picture because the corresponding pictures are not present in the DPB. Each inactive entry in RefPicList[0] or RefPicList[0] that is equal to no reference picture should be ignored. An unintentional picture loss should be inferred for each active entry in RefPicList[0] or RefPicList[1] that is equal to no reference picture.

For bitstream conformance, the following constraints should apply. For each i equal to 0 or 1, num_ref_entries[i]

[RplsIdx[i]] should not be less than NumRefIdxActive[i]. The picture referred to by each active entry in RefPicList[0] or RefPicList[1] should be present in the DPB and should have TemporalId less than or equal to that of the current picture. The picture referred to by each entry in RefPicList [0] or RefPicList[1] should not be the current picture. An STRP entry in RefPicList[0] or RefPicList[1] of a slice of a picture and an LTRP entry in RefPicList[0] or RefPicList[1] of the same slice or a different slice of the same picture should not refer to the same picture. There should be no LTRP entry in RefPicList[0] or RefPicList[1] for which the difference between the PicOrderCntVal of the current picture and the PicOrderCntVal of the picture referred to by the entry is greater than or equal to two hundred twenty four. Let setOfRefPics be the set of unique pictures referred to by all entries in RefPicList[0] that have the same nuh_layer_id as the current picture and all entries in RefPicList[1] that have the same nuh_layer_id as the current picture. The number of pictures in setOfRefPics should be less than or equal to sps_max_dec_pic_buffering_minus1 and setOfRefPics should be the same for all slices of a picture. The picture referred to by each ILRP entry in RefPicList[0] or RefPicList[1] of a slice of the current picture should be in the same access unit as the current picture. The picture referred to by each ILRP entry in RefPicList[0] or RefPicList[1] of a slice of the current picture should be present in the DPB and should have nuh_layer_id less than that of the current picture. Each ILRP entry in RefPicList[0] or RefPicList[1] of a slice should be an active entry.

An example decoding process for reference picture marking is as follows. This process is invoked once per picture, after decoding of a slice header and the decoding process for reference picture list construction for the slice, but prior to the decoding of the slice data. This process may result in one or more reference pictures in the DPB being marked as unused for reference or used for long-term reference. A decoded picture in the DPB can be marked as unused for reference, used for short-term reference or used for long-term reference. But the decoded picture may only be marked as one among these three at any given moment during the operation of the decoding process. Assigning one of these markings to a picture implicitly removes another of these markings when applicable. When a picture is referred to as being marked as used for reference, this collectively refers to the picture being marked as used for short-term reference or used for long-term reference, but not both. STRPs and ILRPs may be identified by their nuh_layer_id and PicOrderCntVal values. LTRPs may be identified by their nuh_layer_id values and the Log 2(MaxLtPicOrderCntLsb) least significant bits (LSBs) of their PicOrderCntVal values. If the current picture is a coded layer video sequence start (CLVSS) picture, all reference pictures currently in the DPB, if any, with the same nuh_layer_id as the current picture are marked as unused for reference. Otherwise, the following applies. For each LTRP entry in RefPicList[0] or RefPicList [1], when the referred picture is an STRP with the same nuh_layer_id as the current picture, the picture is marked as used for long-term reference. Each reference picture with the same nuh_layer_id as the current picture in the DPB that is not referred to by any entry in RefPicList[0] or RefPicList [1] is marked as unused for reference. For each ILRP entry in RefPicList[0] or RefPicList[1], the referred picture is marked as used for long-term reference.

A second example implementation of the abovementioned methods is described below. Example definitions are as follows. An ILRP is a picture in the same access unit with the current picture and has nuh_layer_id that is less than nuh_layer_id of the current picture and is marked as used for long-term reference. A LTRP is a picture with nuh_layer_id equal to nuh_layer_id of the current picture and that is marked as used for long-term reference. A reference picture is a picture that is a short-term reference picture or a long-term reference picture, or an inter-layer reference picture. A reference picture contains samples that may be used for inter-prediction in the decoding process of subsequent pictures in decoding order. A STRP is a picture with nuh_layer_id equal to nuh_layer_id of the current picture and that is marked as used for short-term reference.

An example video parameter set syntax is as follows.

|  | Descriptor |
|---|---|
| video_parameter_set_rbsp( ) { |  |
|   vps_video_parameter_set_id | u(4) |
|   vps_max_layer_id | u(7) |
|   vps_reserved_zero_bit | u(1) |
|   vps_max_layers_minus1 | u(8) |
|   for( i = 0; i <= vps_max_layers_minus1; i++ ) { |  |
|     vps_included_layer_id[ i ] | u(7) |
|     vps_reserved_zero_bit | u(1) |
|   } |  |
|   vps_constraint_info_present_flag | u(1) |
|   vps_reserved_zero_7bits | u(7) |
|   if( vps_constraint_info_present_flag ) |  |
|     general_constraint_info( ) |  |
|   vps_extension_flag | u(1) |
|   if( vps_extension_flag ) |  |
|     while( more_rbsp_data( ) ) |  |
|       vps_extension_data_flag | u(1) |
|   rbsp_trailing_bits( ) |  |
| } |  |

An example video parameter set RBSP semantics is as follows. A vps_video_parameter_set_id provides an identifier for the VPS for reference by other syntax elements. A vps_max_layer_id specifies the maximum allowed value of nuh_layer_id in each CVS referring to the video parameter set (VPS). Once determined when generating the original bitstream, the value of vps_max_layer_id is expected to stay unchanged. This includes when the original bitstream is rewritten or a rewritten bitstream is further rewritten. Otherwise, the picture order count values may be disrupted and unexpected behaviours may occur. Alternatively, the maximum allowed value of nuh_layer_id signaled in the SPS instead and named sps_max_layer_id.

An example general slice header semantics is as follows. A slice_type specifies the coding type of the slice according to the following table.

TABLE 7-4

Name association to slice_type

| slice_type | Name of slice_type |
|---|---|
| 0 | B (B slice) |
| 1 | P (P slice) |
| 2 | I (I slice) |

When NalUnitType is a value of NalUnitType in the range of IDR_W_RADL to CRA_NUT, inclusive, and the current picture is the first picture in an access unit, slice_type should be equal to two. The slice_pic_order_cnt_lsb specifies the value of PicOrderCntVal modulo MaxPicOrderCntLsb for the current picture. The length of the slice_pic_order_cnt_lsb syntax element is log2_maxpic_order_cnt_lsb_minus4+4 bits. The value of the slice_pic_order_cnt_lsb should be in the range of zero to MaxPicOrderCntLsb−1, inclusive. A slice_poc_lsb_lt[i][j] specifies the value of PicOrderCntVal modulo MaxPicOrderCntLsb of the j-th LTRP entry in the i-th reference picture list. The length of the slice_poc_lsb_lt[i][j] syntax element is log2_max_pic_order_cnt_lsb_minus4+4 bits. A st_ref_pic_flag[listIdx][rplsIdx][i] may be set equal to one to specify that the i-th entry in the ref_pic_list_struct(listIdx, rplsIdx) syntax structure is a non-LTRP entry (an STRP or ILRP entry). The st_ref_pic_flag[listIdx][rplsIdx][i] may be set equal to zero to specify that the i-th entry in the ref_pic_list_struct(listIdx, rplsIdx) syntax structure is an LTRP entry. When not present, the value of st_ref_pic_flag[listIdx][rplsIdx][i] may be inferred to be equal to one.

The variable NumLtrpEntries[listIdx][rplsIdx] may be derived as follows:
  for(i=0, NumLtrpEntries[listIdx][rplsIdx]=0; i<num_ref_entries[listIdx][rplsIdx]; i++)
    if(!st_ref_pic_flag[listIdx][rplsIdx][i])  (7-87)
      NumLtrpEntries[listIdx][rplsIdx]++

The abs_delta_poc_st[listIdx][rplsIdx][i] specifies the absolute difference between the CrossLayerPoc values of the current picture and the picture referred to by the i-th entry when the i-th entry is the first non-LTRP entry in ref_pic_list_struct(listIdx, rplsIdx) syntax structure. The abs_delta_poc_st[listIdx][rplsIdx][i] specifies the absolute difference between the CrossLayerPoc values of the pictures referred to by the i-th entry and by the previous non-LTRP entry in the ref_pic_list_struct(listIdx, rplsIdx) syntax structure when the i-th entry is a non-LTRP entry but not the first non-LTRP entry in the ref_pic_list_struct(listIdx, rplsIdx) syntax structure. The value of abs_delta_poc_st[listIdx][rplsIdx][i] may be in the range of zero to $(2^{15}-1)*$ (vps_max_layer_id+1), inclusive. An entry_sign_flag[listIdx][rplsIdx][i] may be set equal to one to specify that an i-th entry in the syntax structure ref_pic_list_struct(listIdx, rplsIdx) has a value greater than or equal to zero. The entry_sign_flag[listIdx][rplsIdx] may be set equal to zero to specify that the i-th entry in the syntax structure ref_pic_list_struct(listIdx, rplsIdx) has a value less than zero. When not present, the value of entry_sign_flag[i][j] is inferred to be equal to one.

The list DeltaPoc[listIdx][rplsIdx] can be derived as follows.

```
for( i = 0; i < num_ref_entries[ listIdx ][ rplsIdx ]; i++ ) {
    if( st_ref_pic_flag[ listIdx ][ rplsIdx ][ i ] ) {                                    (7-88)
        DeltaPoc[ listIdx ][ rplsIdx ][ i ] = ( entry_sign_flag[ listIdx ][ rplsIdx ][ i ] ) ?
          abs_delta_poc_st[ listIdx ][ rplsIdx ][ i ] : 0 −
    abs_delta_poc_st[ listIdx ][ rplsIdx ][ i ]
    }
}
```

A rpls_poc_lsb_lt[listIdx][rplsIdx][i] specifies the value of PicOrderCntVal modulo MaxPicOrderCntLsb of the picture referred to by the i-th entry in the ref_pic_list_struct (listIdx, rplsIdx) syntax structure. The length of the rpls_poc_lsb_lt[listIdx][rplsIdx][i] syntax element is log2_max_pic_order_cnt_lsb_minus4+4 bits.

An example decoding process for a coded picture is as follows. The decoding process operates as follows for the current picture CurrPic. The decoding of NAL units is as specified herein. The following decoding processes use syntax elements in the slice header layer and above. Variables and functions relating to picture order count are derived. Such derivation may be invoked only for the first slice of a picture. At the beginning of the decoding process for each slice of a non-IDR picture, the decoding process for reference picture lists construction is invoked for derivation of reference picture list 0 (RefPicList[0]) and reference picture list 1 (RefPicList[1]). The decoding process for reference picture marking is invoked. Reference pictures may be marked as unused for reference or used for long-term reference. This mechanism may be invoked only for the first slice of a picture. When the current picture is a CRA picture with NoIncorrectPicOutputFlag equal to one or GRA picture with NoIncorrectPicOutputFlag equal to one, the decoding process for generating unavailable reference pictures is invoked. This process may be invoked only for the first slice of a picture.

A PictureOutputFlag may be set as follows. If one of the following conditions is true, PictureOutputFlag is set equal to zero. When the current picture is a RASL picture and NoIncorrectPicOutputFlag of the associated IRAP picture is equal to one, the PictureOutputFlag is set equal to zero. When gra_enabled_flag is equal to one and the current picture is GRA picture with NoIncorrectPicOutputFlag equal to one, the PictureOutputFlag is set equal to zero. When gra_enabled_flag is equal to one, the current picture is associated with a GRA picture with NoIncorrectPicOutputFlag equal to 1, and PicOrderCntVal of the current picture is less than RpPicOrderCntVal of the associated GRA picture, the PictureOutputFlag is set equal to zero. Otherwise, PictureOutputFlag is set equal to one. After all slices of the current picture have been decoded, the current decoded picture may be marked as used for short-term reference, and each ILRP entry in RefPicList[0] or RefPicList[1] may be marked as used for short-term reference.

An example decoding process for picture order count is as follows. An output of this process is CrossLayerPoc, which is the picture order count of the current picture. Each coded picture is associated with a picture order count variable denoted as CrossLayerPoc. When the current picture is not a CLVSS picture, the variables prevPicOrderCntLsb and prevPicOrderCntMsb can be derived as follows. Let prevTid0Pic be the previous picture in decoding order that has nuh_layer_id equal to the nuh_layer_id of the current picture and TemporalId equal to zero and that is not a RASL or RADL picture. The variable prevPicOrderCntLsb may be set equal to slice_pic_order_cnt_lsb of prevTid0Pic. The variable prevPicOrderCntMsb may be set equal to PicOrderCntMsb of prevTid0Pic. The variable PicOrderCntMsb of the current picture may be derived as follows. If the current picture is a CLVSS picture, the PicOrderCntMsb may be set equal to zero. Otherwise, PicOrderCntMsb may be derived as follows.

```
if( ( slice_pic_order_cnt_lsb < prevPicOrderCntLsb ) &&
    ( ( prevPicOrderCntLsb - slice_pic_order_cnt_lsb ) >= ( MaxPicOrderCntLsb / 2 ) ) )
  PicOrderCntMsb = prevPicOrderCntMsb + MaxPicOrderCntLsb
else if( (slice_pic_order_cnt_lsb > prevPicOrderCntLsb ) &&
    ( ( slice_pic_order_cnt_lsb - prevPicOrderCntLsb ) > ( MaxPicOrderCntLsb / 2 ) ) )
  PicOrderCntMsb = prevPicOrderCntMsb - MaxPicOrderCntLsb
else
  PicOrderCntMsb = prevPicOrderCntMsb
```

PicOrderCntVal can be derived as follows.

PicOrderCntVal=PicOrderCntMsb+slice_pic_order_cnt_lsb

All CLVSS pictures may have PicOrderCntVal set equal to slice_pic_order_cnt_lsb since for CLVSS pictures when PicOrderCntMsb is set equal to zero. The value of PicOrderCntVal may be in the range of $-2^{31}$ to $2^{31}-1$, inclusive. In one CVS, the PicOrderCntVal values for any two coded pictures with the same value of nuh_layer_id may not be the same. All pictures in any particular access unit may have the same value of PicOrderCntVal.

The variable CrossLayerPoc may be derived as follows.

CrossLayerPoc=PicOrderCntVal*(vps_max_layer_id+1)+nuh_layer_id

The function PicOrderCnt(picX) may be specified as follows.

PicOrderCnt(picX)=PicOrderCntVal of the picture picX

The function DiffPicOrderCnt(picA, picB) may be specified as follows.

DiffPicOrderCnt(picA,picB)=PicOrderCnt(picA)−PicOrderCnt(picB)

The bitstream may not contain data that result in values of DiffPicOrderCnt(picA, picB) used in the decoding process that are not in the range of $-2^{15}$ to $2^{15}-1$, inclusive. Let X be the current picture and Y and Z be two other pictures in the same CVS. Y and Z may be considered to be in the same output order direction from X when both DiffPicOrderCnt(X, Y) and DiffPicOrderCnt(X, Z) are positive or both are negative.

An example decoding process for reference picture lists construction is as follows. This process may be invoked at the beginning of the decoding process for each slice of a non-IDR picture. Reference pictures are addressed through reference indices. A reference index is an index into a reference picture list. When decoding an I slice, no reference picture list is used in decoding of the slice data. When decoding a P slice, only reference picture list zero (RefPicList[0]), is used in decoding of the slice data. When decoding a B slice, both reference picture list zero and reference picture list one (RefPicList[1]) are used in decoding of the slice data. At the beginning of the decoding process for each slice of a non-IDR picture, the reference picture lists RefPicList[0] and RefPicList[1] are derived. The reference picture lists may be used in marking of reference pictures or in decoding of the slice data. For an I slice of a non-IDR picture that it is not the first slice of the picture, RefPicList[0] and RefPicList[1] may be derived for bitstream conformance checking purpose. But their derivation may not be necessary for decoding of the current picture or pictures following the current picture in decoding order. For a P slice that it is not the first slice of a picture, RefPicList[1] may be derived for bitstream conformance checking purpose. But derivation of RefPicList[1] may not be necessary for decoding of the current picture or pictures following the current picture in decoding order. The reference picture lists RefPicList[0] and RefPicList[1] may be constructed as follows.

```
for( i = 0; i < 2; i++ ) {
  for( j = 0, k = 0, pocBase = CrossLayerPoc; j < num_ref_entries[ i ][ RplsIdx[ i ] ];
j++) {
    if( st_ref_pic_flag[ i ][ RplsIdx[ i ] ][ j ] ) {
      RefPicPocList[ i ][ j ] = pocBase - DeltaPoc[ i ][RplsIdx[ i ] ][ j ]
      if( there is a reference picture picA in the DPB with CrossLayerPoc equal
to RefPicPocList[ i ][ j ] )
        RefPicList[ i ][ j ] = picA
      else
        RefPicList[ i ][ j ] = "no reference picture"                                      (8-5)
      pocBase = RefPicPocList[ i ][ j ]
    } else {
      if( !delta_poc_msb_cycle_lt[ i ][ k ] ) {
        if( there is a reference picA in the DPB with the same nuh_layer_id as
the current picture and PicOrderCntVal & ( MaxPicOrderCntLsb - 1) equal to
PocLsbLt[ i ][ k ] )
          RefPicList[ i ][ j ] = picA
        else
          RefPicList[ i ][ j ] = "no reference picture"
      } else {
        if( there is a reference picA in the DPB with the same nuh_layer_id as
the current picture and PicOrderCntVal equal to FullPocLt[ i ][RplsIdx[ i ][ k ] )
          RefPicList[ i ][ j ] = picA
```

```
            else
                RefPicList[ i ][ j ] = "no reference picture"
        }
        k++
    }
  }
}
```

For each i equal to 0 or 1, the first NumRefIdxActive[i] entries in RefPicList[i] are referred to as the active entries in RefPicList[i], and the other entries in RefPicList[i] are referred to as the inactive entries in RefPicList[i]. An entry in a reference picture list may be referred to as an ILRP entry when the picture referred to by the entry has a different value of nuh_layer_id than the current picture. It is possible that a particular picture is referred to by both an entry in RefPicList[0] and an entry in RefPicList[1]. It is also possible that a particular picture is referred to by more than one entry in RefPicList[0] or by more than one entry in RefPicList[1]. The active entries in RefPicList[0] and the active entries in RefPicList[1] collectively refer to all reference pictures that may be used for inter-prediction of the current picture and one or more pictures that follow the current picture in decoding order. The inactive entries in RefPicList[0] and the inactive entries in RefPicList[1] collectively refer to all reference pictures that are not used for inter-prediction of the current picture but may be used in inter-prediction for one or more pictures that follow the current picture in decoding order. There may be one or more entries in RefPicList[0] or RefPicList[1] that are equal to no reference picture because the corresponding pictures are not present in the DPB. Each inactive entry in RefPicList[0] or RefPicList[0] that is equal to no reference picture may be ignored. An unintentional picture loss may be inferred for each active entry in RefPicList[0] or RefPicList[1] that is equal to no reference picture.

Bitstream conformance may require that the following constraints be applied. For each i equal to zero or one, num_ref_entries[i][RplsIdx[i] ] may not be less than NumRefIdxActive[i]. The picture referred to by each active entry in RefPicList[0] or RefPicList[1] may be present in the DPB and may have TemporalId less than or equal to that of the current picture. The picture referred to by each entry in RefPicList[0] or RefPicList[1] may not be the current picture. An STRP entry in RefPicList[0] or RefPicList[1] of a slice of a picture and an LTRP entry in RefPicList[0] or RefPicList[1] of the same slice or a different slice of the same picture may not refer to the same picture. There may be no LTRP entry in RefPicList[0] or RefPicList[1] for which the difference between the PicOrderCntVal of the current picture and the PicOrderCntVal of the picture referred to by the entry is greater than or equal to two hundred twenty four. Let setOfRefPics be the set of unique pictures referred to by all entries in RefPicList[0] that have the same nuh_layer_id as the current picture and all entries in RefPicList[1] that have the same nuh_layer_id as the current picture. The number of pictures in setOfRefPics may be less than or equal to sps_max_dec_pic_buffering_minus1 and setOfRefPics may be the same for all slices of a picture. The picture referred to by each ILRP entry in RefPicList[0] or RefPicList[1] of a slice of the current picture may be present in the DPB and may be in the same access unit as the current picture. The picture referred to by each ILRP entry in RefPicList[0] or RefPicList[1] of a slice of the current picture may have nuh_layer_id less than that of the current picture. Each ILRP entry in RefPicList[0] or RefPicList[1] of a slice may be an active entry.

An example decoding process for reference picture marking is as follows. This process may be invoked once per picture. This may occur after decoding of a slice header and the decoding process for reference picture list construction for the slice, but prior to the decoding of the slice data. This process may result in one or more reference pictures in the DPB being marked as unused for reference or used for long-term reference. A decoded picture in the DPB can be marked as unused for reference, used for short-term reference, or used for long-term reference. A decoded picture in the DPB can be marked as only one among these three at any given moment during the operation of the decoding process. Assigning one of these markings to a picture implicitly removes another of these markings when applicable. When a picture is referred to as being marked as used for reference, this collectively refers to the picture being marked as used for short-term reference or used for long-term reference (but not both). STRPs are identified by their nuh_layer_id and PicOrderCntVal values. LTRPs are identified by their nuh_layer_id values and the Log 2(MaxLtPicOrderCntLsb) LSBs of their PicOrderCntVal values. If the current picture is a CLVSS picture, all reference pictures currently in the DPB (if any) with the same nuh_layer_id as the current picture may be marked as unused for reference. Otherwise, the following applies. For each LTRP entry in RefPicList[0] or RefPicList[1], the referred picture is marked as used for long-term reference when the referred picture is an STRP with the same nuh_layer_id as the current picture. Each reference picture in the DPB with the same nuh_layer_id as the current picture that is not referred to by any entry in RefPicList[0] or RefPicList[1] may be marked as unused for reference. For each ILRP entry in RefPicList[0] or RefPicList[1], the referred picture may be marked as used for long-term reference.

A third example implementation of the abovementioned methods is described below. An example of definitions is as follows. An ILRP is a picture in the same access unit with the current picture and has nuh_layer_id that is less than nuh_layer_id of the current picture and is marked as used for long-term reference. A LTRP is a picture with nuh_layer_id equal to nuh_layer_id of the current picture and that is marked as used for long-term reference. A reference picture is a picture that is a short-term reference picture or a long-term reference picture, or an inter-layer reference picture. A reference picture contains samples that may be used for inter-prediction in the decoding process of subsequent pictures in decoding order. A STRP is a picture with nuh_layer_id equal to nuh_layer_id of the current picture and that is marked as used for short-term reference.

An example general slice header semantics is as follows. The slice type may specify the coding type of the slice according to the following table.

TABLE 7-4

Name association to slice_type

| slice_type | Name of slice_type |
|---|---|
| 0 | B (B slice) |
| 1 | P (P slice) |
| 2 | I (I slice) |

Slice_type may be set equal to two when NalUnitType is a value of NalUnitType in the range of IDR_W_RADL to CRA_NUT, inclusive, and the current picture is the first picture in an access unit.

An example decoding process for a coded picture is as follows. The decoding process operates as follows for the current picture CurrPic. The decoding of NAL units is as specified herein. The following decoding processes use syntax elements in the slice header layer and above. Variables and functions relating to picture order count are derived. Such derivation may be invoked only for the first slice of a picture. At the beginning of the decoding process for each slice of a non-IDR picture, the decoding process for reference picture lists construction is invoked for derivation of reference picture list 0 (RefPicList[0]) and reference picture list 1 (RefPicList[1]). The decoding process for reference picture marking is invoked. Reference pictures may be marked as unused for reference or used for long-term reference. This mechanism may be invoked only for the first slice of a picture. When the current picture is a CRA picture with NoIncorrectPicOutputFlag equal to one or GRA picture with NoIncorrectPicOutputFlag equal to one, the decoding process for generating unavailable reference pictures is invoked. This process may be invoked only for the first slice of a picture.

A PictureOutputFlag may be set as follows. If one of the following conditions is true, PictureOutputFlag is set equal to zero. When the current picture is a RASL picture and NoIncorrectPicOutputFlag of the associated IRAP picture is equal to one, the PictureOutputFlag is set equal to zero. When gra_enabled_flag is equal to one and the current picture is a GRA picture with NoIncorrectPicOutputFlag equal to one, the PictureOutputFlag is set equal to zero. When gra_enabled_flag is equal to one, the current picture is associated with a GRA picture with NoIncorrectPicOutputFlag equal to 1, and PicOrderCntVal of the current picture is less than RpPicOrderCntVal of the associated GRA picture, the PictureOutputFlag is set equal to zero. Otherwise, PictureOutputFlag is set equal to one. After all slices of the current picture have been decoded, the current decoded picture may be marked as used for short-term reference, and each ILRP entry in RefPicList[0] or RefPicList[1] may be marked as used for short-term reference.

An example decoding process for picture order count is as follows. An output of this process is PicOrderCntVal, which is the picture order count of the current picture. Each coded picture may be associated with a picture order count variable, denoted as PicOrderCntVal. When the current picture is not a CLVSS picture that is the first picture in an access unit in decoding order, the variables prevPicOrderCntLsb and prevPicOrderCntMsb may be derived as follows. Let prevTid0Pic be the previous picture in decoding order that has nuh_layer_id less than or equal to the nuh_layer_id of the current picture and TemporalId equal to zero and that is not a RASL or RADL picture. The variable prevPicOrderCntLsb may be set equal to slice_pic_order_cnt_lsb of prevTid0Pic. The variable prevPicOrderCntMsb may be set equal to PicOrderCntMsb of prevTid0Pic. The variable PicOrderCntMsb of the current picture may derived as follows. If the current picture is a CLVSS picture that is the first picture in an access unit in decoding order, PicOrderCntMsb may be set equal to zero. Otherwise, PicOrderCntMsb is derived as follows:

```
if( ( slice_pic_order_cnt_lsb < prevPicOrderCntLsb ) &&
    ( ( prevPicOrderCntLsb - slice_pic_order_cnt_lsb ) >= ( MaxPicOrderCntLsb / 2 ) ) )
    PicOrderCntMsb = prevPicOrderCntMsb + MaxPicOrderCntLsb
else if( (slice_pic_order_cnt_lsb > prevPicOrderCntLsb ) &&
    ( ( slice_pic_order_cnt_lsb - prevPicOrderCntLsb ) > ( MaxPicOrderCntLsb / 2 ) ) )
    PicOrderCntMsb = prevPicOrderCntMsb - MaxPicOrderCntLsb
else
    PicOrderCntMsb = prevPicOrderCntMsb
```

PicOrderCntVal may be derived as follows.

PicOrderCntVal=PicOrderCntMsb+slice_pic_order_cnt_lsb

Each CLVSS picture that is the first picture in an access unit in decoding order may have a PicOrderCntVal set equal to slice_pic_order_cnt_lsb since PicOrderCntMsb is set equal to zero. The value of PicOrderCntVal may be in the range of $-2^{31}$ to $2^{31}-1$, inclusive. In one CVS, the PicOrderCntVal values for any two coded pictures may not be the same. The function PicOrderCnt(picX) may be specified as follows.

PicOrderCnt(picX)=PicOrderCntVal of the picture picX

The function DiffPicOrderCnt(picA, picB) may be specified as follows.

DiffPicOrderCnt(picA,picB)=PicOrderCnt(picA)−PicOrderCnt(picB)

The bitstream may not contain data that result in values of DiffPicOrderCnt(picA, picB) used in the decoding process that are not in the range of $-2^{15}$ to $2^{15}-1$, inclusive. Let X be the current picture and Y and Z be two other pictures in the same CVS. Y and Z may be considered to be in the same output order direction from X when both DiffPicOrderCnt (X, Y) and DiffPicOrderCnt(X, Z) are positive or both are negative.

An example decoding process for reference picture lists construction is as follows. This process may be invoked at the beginning of the decoding process for each slice of a non-IDR picture. Reference pictures are addressed through reference indices. A reference index is an index into a reference picture list. When decoding an I slice, no reference picture list is used in decoding of the slice data. When decoding a P slice, only reference picture list zero (RefPicList[0]), is used in decoding of the slice data. When decoding a B slice, both reference picture list zero and reference picture list one (RefPicList[1]) are used in decoding of the slice data. At the beginning of the decoding process for each slice of a non-IDR picture, the reference picture lists RefPicList[0] and RefPicList[1] are derived. The reference picture lists are used in marking of reference pictures or in decoding of the slice data. For an I slice of a non-IDR picture that it is not the first slice of the picture, RefPicList[0] and RefPicList[1] may be derived for bitstream conformance checking purpose. Their derivation is not necessary for decoding of the current picture or pictures following the current picture in decoding order. For a P slice that it is not the first slice of a picture, RefPicList[1] may be derived for bitstream conformance checking purpose. But such derivation is not necessary for decoding of the current picture or pictures following the current picture in decoding order. The reference picture lists RefPicList[0] and RefPicList[1] may be constructed as follows.

```
for( i = 0; i < 2; i++ ) {
    for( j = 0, k = 0, pocBase = PicOrderCntVal; j <
num_ref_entries[ i ][ RplsIdx[ i ] ]; j++) {
        if( st_ref_pic_flag[ i ][ RplsIdx[ i ] ][ j ] ) {
            RefPicPocList[ i ][ j ] = pocBase − DeltaPocSt[ i ][ RplsIdx[ i ] ][ j ]
            if( there is a reference picture picA in the DPB with PicOrderCntVal equal
to RefPicPocList[ i ][ j ] )
                RefPicList[ i ][ i ] = picA
            else
                RefPicList[ i ][ j ] = "no reference picture"          (8-5)
            pocBase = RefPicPocList[ i ][ j ]
        } else {
            if( !delta_poc_msb_cycle_lt[ i ][ k ] ) {
                if( there is a reference picA in the DPB with
                        PicOrderCntVal & ( MaxPicOrderCntLsb − 1 ) equal to
PocLsbLt[ i ][ k ])
                    RefPicList[ i ][ j ] = picA
                else
                    RefPicList[ i ][ j ] = "no reference picture"
            } else {
                if( there is a reference picA in the DPB with
                        PicOrderCntVal equal to FullPocLt[ i ][ k ] )
                    RefPicList[ i ][ j ] = picA
                else
                    RefPicList[ i ][ j ] = "no reference picture"
            }
            k++
        }
    }
}
```

For each i equal to zero or one, the first NumRefIdxActive[i] entries in RefPicList[i] are referred to as the active entries in RefPicList[i] and the other entries in RefPicList[i] are referred to as the inactive entries in RefPicList[i]. An entry in a reference picture list may be referred to as an ILRP entry when the picture referred to by the entry has a different value of nuh_layer_id than the current picture. It is possible that a particular picture is referred to by both an entry in RefPicList[0] and an entry in RefPicList[1]. It is also possible that a particular picture is referred to by more than one entry in RefPicList[0] or by more than one entry in RefPicList[1]. The active entries in RefPicList[0] and the active entries in RefPicList[1] may collectively refer to all reference pictures that may be used for inter-prediction of the current picture and one or more pictures that follow the current picture in decoding order. The inactive entries in RefPicList[0] and the inactive entries in RefPicList[1] may collectively refer to all reference pictures that are not used for inter-prediction of the current picture but may be used in inter-prediction for one or more pictures that follow the current picture in decoding order. There may be one or more entries in RefPicList[0] or RefPicList[1] that are equal to no reference picture because the corresponding pictures are not present in the DPB. Each inactive entry in RefPicList[0] or RefPicList[0] that is equal to no reference picture may be ignored. An unintentional picture loss may be inferred for each active entry in RefPicList[0] or RefPicList[1] that is equal to no reference picture.

The following constraints may apply for bitstream conformance. For each i equal to zero or one, num_ref_entries[i][RplsIdx[i]] may not be less than NumRefIdxActive[i]. The picture referred to by each active entry in RefPicList[0] or RefPicList[1] may be present in the DPB and may have TemporalId less than or equal to that of the current picture. The picture referred to by each entry in RefPicList[0] or RefPicList[1] may not be the current picture. An STRP entry in RefPicList[0] or RefPicList[1] of a slice of a picture and an LTRP entry in RefPicList[0] or RefPicList[1] of the same slice or a different slice of the same picture may not refer to the same picture. There may be no LTRP entry in RefPicList [0] or RefPicList[1] for which the difference between the PicOrderCntVal of the current picture and the PicOrderCntVal of the picture referred to by the entry is greater than or equal to two hundred twenty four. Let setOfRefPics be the set of unique pictures referred to by all entries in RefPicList [0] that have the same nuh_layer_id as the current picture and all entries in RefPicList[1] that have the same nuh_layer_id as the current picture. The number of pictures in setOfRefPics may be less than or equal to sps_max_dec_pic_buffering_minus1 and setOfRefPics may be the same for all slices of a picture. The picture referred to by each ILRP entry in RefPicList[0] or RefPicList[1] of a slice of the current picture may be in the same access unit as the current picture. The picture referred to by each ILRP entry in RefPicList[0] or RefPicList[1] of a slice of the current picture may be present in the DPB and may have a nuh_layer_id less than that of the current picture. Each ILRP entry in RefPicList[0] or RefPicList[1] of a slice may be an active entry.

An example decoding process for reference picture marking is as follows. This process may be invoked once per picture after decoding of a slice header and the decoding process for reference picture list construction for the slice. The process may also be invoked prior to the decoding of the slice data. This process may result in one or more reference pictures in the DPB being marked as unused for reference or used for long-term reference. A decoded picture in the DPB can be marked as unused for reference, used for short-term reference or used for long-term reference. A decoded picture in the DPB can only be marked as one among these three at any given moment during the operation of the decoding process. Assigning one of these markings to a picture implicitly removes another of these markings when applicable. When a picture is referred to as being marked as used for reference, this collectively refers to the picture being marked as used for short-term reference or used for long-term reference (but not both). STRPs and ILRPs may be identified by their nuh_layer_id and PicOrderCntVal values. LTRPs may be identified by their nuh_layer_id values and the Log 2(MaxLtPicOrderCntLsb)LSBs of their PicOrderCntVal values. If the current picture is a CLVSS picture, all reference pictures currently in the DPB (if any) with the same nuh_layer_id as the current picture may be marked as unused for reference. Otherwise, the following applies. For each LTRP entry in RefPicList[0] or RefPicList[1], when the referred picture is an STRP with the same nuh_layer_id as the current picture, the picture is marked as used for long-term reference. Each reference picture with the same nuh_layer_id as the current picture in the DPB that is not referred to by any entry in RefPicList[0] or RefPicList[1] may be marked as unused for reference. For each ILRP entry in RefPicList[0] or RefPicList[1], the referred picture may be marked as used for long-term reference.

A fourth example implementation of the abovementioned methods is described below. An example decoding process for picture order count is as follows. Output of this process is PicOrderCntVal, which is the picture order count of the current picture. Each coded picture is associated with a picture order count variable denoted as PicOrderCntVal. When the current picture is not a CLVSS picture, the variables prevPicOrderCntLsb and prevPicOrderCntMsb may be derived as follows. Let prevTid0Pic be the previous picture in decoding order that has nuh_layer_id less than or equal to the nuh_layer_id of the current picture and TemporalId equal to zero and that is not a RASL or RADL picture. The variable prevPicOrderCntLsb may be set equal to slice_pic_order_cnt_lsb of prevTid0Pic. The variable prevPicOrderCntMsb may be set equal to PicOrderCntMsb of prevTid0Pic. The variable PicOrderCntMsb of the current picture may be derived as follows. If the current picture is a CLVSS picture, PicOrderCntMsb may be set equal to zero. Otherwise, PicOrderCntMsb may be derived as follows.

erCntMsb is set equal to zero. The value of PicOrderCntVal may be in the range of $-2^{31}$ to $2^{31}-1$, inclusive. In one CVS, the PicOrderCntVal values for any two coded pictures may not be the same. The function PicOrderCnt(picX) may be specified as follows.

PicOrderCnt(picX)=PicOrderCntVal of the picture picX

The function DiffPicOrderCnt(picA, picB) may be specified as follows.

DiffPicOrderCnt(picA,picB)=PicOrderCnt(picA)−PicOrderCnt(picB)

The bitstream may not contain data that result in values of DiffPicOrderCnt(picA, picB) used in the decoding process that are not in the range of $-2^{15}$ to $2^{15}-1$, inclusive. Let X be the current picture and Y and Z be two other pictures in the same CVS. Y and Z are considered to be in the same output order direction from X when both DiffPicOrderCnt (X, Y) and DiffPicOrderCnt(X, Z) are positive or both are negative.

An example decoding process for reference picture lists construction is as follows. This process may be invoked at the beginning of the decoding process for each slice of a non-IDR picture. Reference pictures are addressed through reference indices. A reference index is an index into a reference picture list. When decoding an I slice, no reference picture list is used in decoding of the slice data. When decoding a P slice, only reference picture list zero (RefPicList[0]), is used in decoding of the slice data. When decoding a B slice, both reference picture list zero and reference picture list one (RefPicList[1]) are used in decoding of the slice data. At the beginning of the decoding process for each slice of a non-IDR picture, the reference picture lists RefPicList[0] and RefPicList[1] may be derived. The reference picture lists may be used in marking of reference pictures or in decoding of the slice data. For an I slice of a non-IDR picture that it is not the first slice of the picture, RefPicList[0] and RefPicList[1] may be derived for bitstream conformance checking purpose. Such derivation may not be necessary for decoding of the current picture or pictures following the current picture in decoding order. For a P slice that is not the first slice of a picture, RefPicList[1] may be derived for bitstream conformance checking pur-

```
if( ( slice_pic_order_cnt_lsb < prevPicOrderCntLsb ) &&
    ( ( prevPicOrderCntLsb − slice_pic_order_cnt_lsb ) >= ( MaxPicOrderCntLsb / 2 ) ) )
  PicOrderCntMsb = prevPicOrderCntMsb + MaxPicOrderCntLsb
else if( (slice_pic_order_cnt_lsb > prevPicOrderCntLsb ) &&
    ( ( slice_pic_order_cnt_lsb − prevPicOrderCntLsb ) > ( MaxPicOrderCntLsb / 2 ) ) )
  PicOrderCntMsb = prevPicOrderCntMsb − MaxPicOrderCntLsb
else
  PicOrderCntMsb = prevPicOrderCntMsb
```

PicOrderCntVal may be derived as follows.

PicOrderCntVal=PicOrderCntMsb+slice_pic_order_cnt_lsb

All CLVSS pictures may have PicOrderCntVal equal to slice_pic_order_cnt_lsb since for CLVSS pictures PicOrdpose. But such derivation may not be necessary for decoding of the current picture or pictures following the current picture in decoding order.

The reference picture lists RefPicList[0] and RefPicList[1] may be constructed as follows.

```
for( i = 0; i < 2; i++ ) {
  for( j = 0, k = 0, pocBase = PicOrderCntVal; j <
    num_ref_entries[ i ][ RplsIdx[ i ] ]; j++) {
    if( st_ref_pic_flag[ i ][ RplsIdx[ i ][ j ] ) {
```

-continued

```
        RefPicPocList[ i ][ j ] = pocBase − DeltaPocSt[ i ][ RplsIdx[ i ] ][ j ]
        if( there is a reference picture picA in the DPB with PicOrderCntVal equal
to RefPicPocList[ i ][ j ] )
            RefPicList[ i ][ j ] = picA
        else
            RefPicList[ i ][ j ] = "no reference picture"                    (8-5)
            pocBase = RefPicPocList[ i ][ j ]
    } else {
        if( !delta_poc_msb_cycle_lt[ i ][ k ] ) {
            if( there is a reference picA in the DPB with
                PicOrderCntVal & ( MaxPicOrderCntLsb − 1) equal to
PocLsbLt[ i ][ k ] )
                RefPicList[ i ][ j ] = picA
            else
                RefPicList[ i ][ j ] = "no reference picture"
        } else {
            if( there is a reference picA in the DPB with
                PicOrderCntVal equal to FullPocLt[ i ][ k ] )
                RefPicList[ i ][ j ] = picA
            else
                RefPicList[ i ][ j ] = "no reference picture"
        }
        k++
    }
  }
}
```

For each i equal to zero or one, the first NumRefIdxActive[i] entries in RefPicList[i] are referred to as the active entries in RefPicList[i], and the other entries in RefPicList[i] are referred to as the inactive entries in RefPicList[i]. It is possible that a particular picture is referred to by both an entry in RefPicList[0] and an entry in RefPicList[1]. It is also possible that a particular picture is referred to by more than one entry in RefPicList[0] or by more than one entry in RefPicList[1]. The active entries in RefPicList[0] and the active entries in RefPicList[1] may collectively refer to all reference pictures that may be used for inter-prediction of the current picture and one or more pictures that follow the current picture in decoding order. The inactive entries in RefPicList[0] and the inactive entries in RefPicList[1] may collectively refer to all reference pictures that are not used for inter-prediction of the current picture but may be used in inter-prediction for one or more pictures that follow the current picture in decoding order. There may be one or more entries in RefPicList[0] or RefPicList[1] that are equal to no reference picture because the corresponding pictures are not present in the DPB. Each inactive entry in RefPicList[0] or RefPicList[0] that is equal to no reference picture may be ignored. An unintentional picture loss may be inferred for each active entry in RefPicList[0] or RefPicList[1] that is equal to no reference picture.

Bitstream conformance may require that the following constraints apply. For each i equal to 0 or 1, num_ref_entries[i][RplsIdx[i]] may not be less than NumRefIdxActive[i]. The picture referred to by each active entry in RefPicList[0] or RefPicList[1] may be present in the DPB and may have a TemporalId less than or equal to that of the current picture. The picture referred to by each entry in RefPicList[0] or RefPicList[1] may not be the current picture. An STRP entry in RefPicList[0] or RefPicList[1] of a slice of a picture and an LTRP entry in RefPicList[0] or RefPicList[1] of the same slice or a different slice of the same picture may not refer to the same picture. There may be no LTRP entry in RefPicList[0] or RefPicList[1] for which the difference between the PicOrderCntVal of the current picture and the PicOrderCntVal of the picture referred to by the entry is greater than or equal to two hundred twenty four. Let setOfRefPics be the set of unique pictures referred to by all entries in RefPicList[0] and all entries in RefPicList[1]. The number of pictures in setOfRefPics may be less than or equal to sps_max_decpic_buffering_minus1 and setOfRefPics may be the same for all slices of a picture. The picture referred to by each active entry in RefPicList[0] or RefPicList[1] may be present in the DPB and may have nuh_layer_id less than or equal to the nuh_layer_id of the current picture.

An example decoding process for reference picture marking is as follows. This process may be invoked once per picture after decoding of a slice header and the decoding process for reference picture list construction for the slice. The process may be invoked prior to the decoding of the slice data. This process may result in one or more reference pictures in the DPB being marked as unused for reference or used for long-term reference. A decoded picture in the DPB can be marked as unused for reference, used for short-term reference or used for long-term reference. A decoded picture in the DPB can only be marked as one among these three at any given moment during the operation of the decoding process. Assigning one of these markings to a picture implicitly removes another of these markings when applicable. When a picture is referred to as being marked as used for reference, this collectively refers to the picture being marked as used for short-term reference or used for long-term reference (but not both). STRPs may be identified by their PicOrderCntVal values. LTRPs may be identified by the Log 2(MaxLtPicOrderCntLsb)LSBs of their PicOrderCntVal values. If the current picture is a CLVSS picture, all reference pictures currently in the DPB (if any) may be marked as unused for reference. Otherwise, the following applies. For each LTRP entry in RefPicList[0] or RefPicList[1], the referred picture is marked as used for long-term reference when the referred picture is an STRP. Each reference picture in the DPB that is not referred to by any entry in RefPicList[0] or RefPicList[1] is marked as unused for reference.

Figure 10:
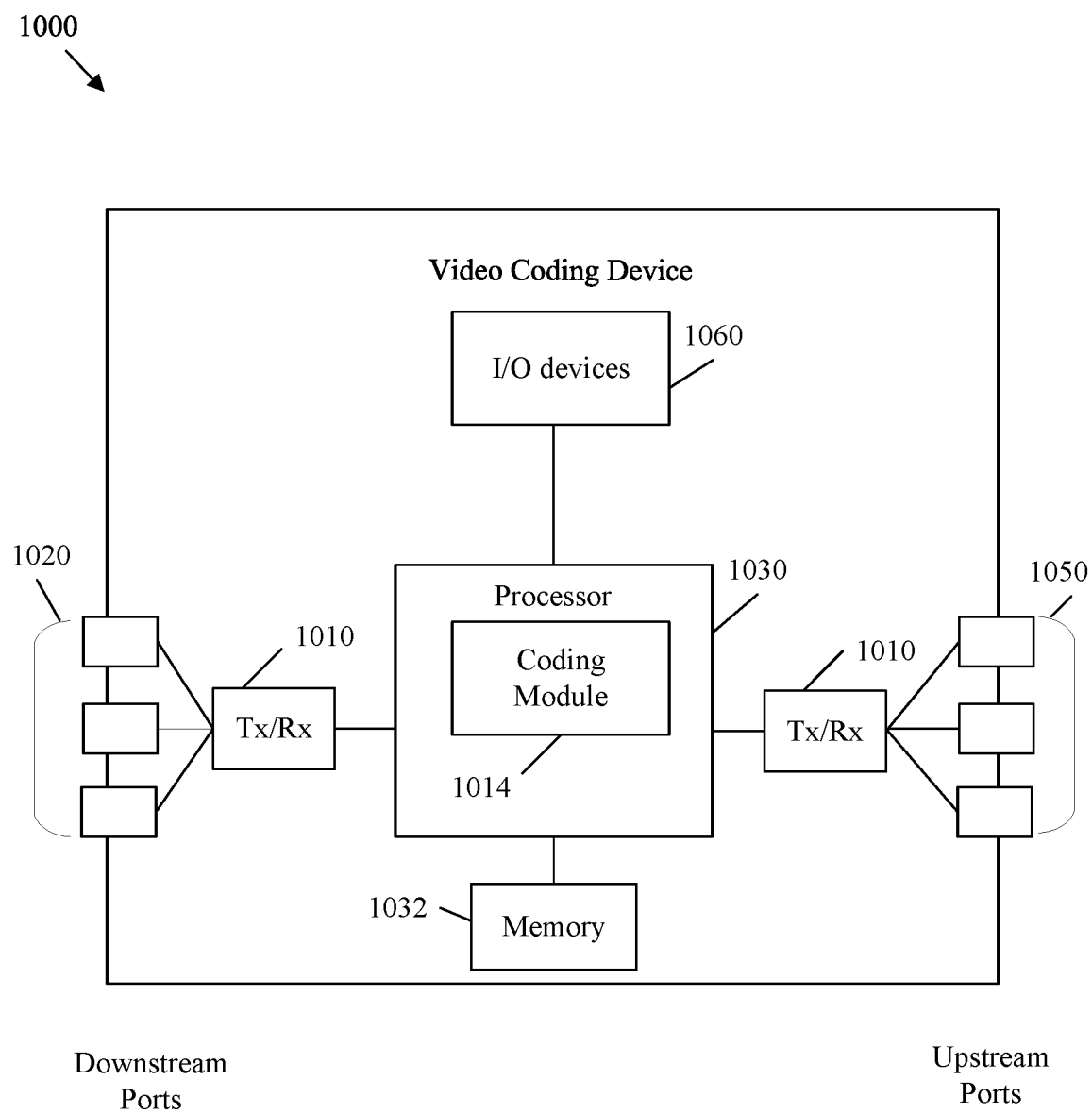
FIG. 10 is a schematic diagram of an example video coding device.

FIG. 10 is a schematic diagram of an example video coding device 1000. The video coding device 1000 is suitable for implementing the disclosed examples/embodiments as described herein. The video coding device 1000 comprises downstream ports 1020, upstream ports 1050, and/or transceiver units (Tx/Rx) 1010, including transmitters and/or receivers for communicating data upstream and/or downstream over a network. The video coding device 1000 also includes a processor 1030 including a logic unit and/or central processing unit (CPU) to process the data and a memory 1032 for storing the data. The video coding device 1000 may also comprise electrical, optical-to-electrical (OE) components, electrical-to-optical (EO) components, and/or wireless communication components coupled to the upstream ports 1050 and/or downstream ports 1020 for communication of data via electrical, optical, or wireless communication networks. The video coding device 1000 may also include input and/or output (I/O) devices 1060 for communicating data to and from a user. The I/O devices 1060 may include output devices such as a display for displaying video data, speakers for outputting audio data, etc. The I/O devices 1060 may also include input devices, such as a keyboard, mouse, trackball, etc., and/or corresponding interfaces for interacting with such output devices.

The processor 1030 is implemented by hardware and software. The processor 1030 may be implemented as one or more CPU chips, cores (e.g., as a multi-core processor), field-programmable gate arrays (FPGAs), application specific integrated circuits (ASICs), and digital signal processors (DSPs). The processor 1030 is in communication with the downstream ports 1020, Tx/Rx 1010, upstream ports 1050, and memory 1032. The processor 1030 comprises a coding module 1014. The coding module 1014 implements the disclosed embodiments described herein, such as methods 100, 1100, and/or 1200, which may employ a bitstream 900 including a RPL structure 800 and pictures which may be coded according to unidirectional inter-prediction 500, bidirectional inter-prediction 600, and/or layer based prediction 700. The coding module 1014 may also implement any other method/mechanism described herein. Further, the coding module 1014 may implement a codec system 200, an encoder 300, and/or a decoder 400. For example, the coding module 1014 can be employed to code an ILRP flag and/or an ILRP layer indicator in a reference picture structure in order to manage reference pictures to support inter-layer prediction as described above. Hence, coding module 1014 causes the video coding device 1000 to provide additional functionality and/or coding efficiency when coding video data. As such, the coding module 1014 improves the functionality of the video coding device 1000 as well as addresses problems that are specific to the video coding arts. Further, the coding module 1014 effects a transformation of the video coding device 1000 to a different state. Alternatively, the coding module 1014 can be implemented as instructions stored in the memory 1032 and executed by the processor 1030 (e.g., as a computer program product stored on a non-transitory medium).

The memory 1032 comprises one or more memory types such as disks, tape drives, solid-state drives, read only memory (ROM), random access memory (RAM), flash memory, ternary content-addressable memory (TCAM), static random-access memory (SRAM), etc. The memory 1032 may be used as an over-flow data storage device, to store programs when such programs are selected for execution, and to store instructions and data that are read during program execution.

Figure 11:
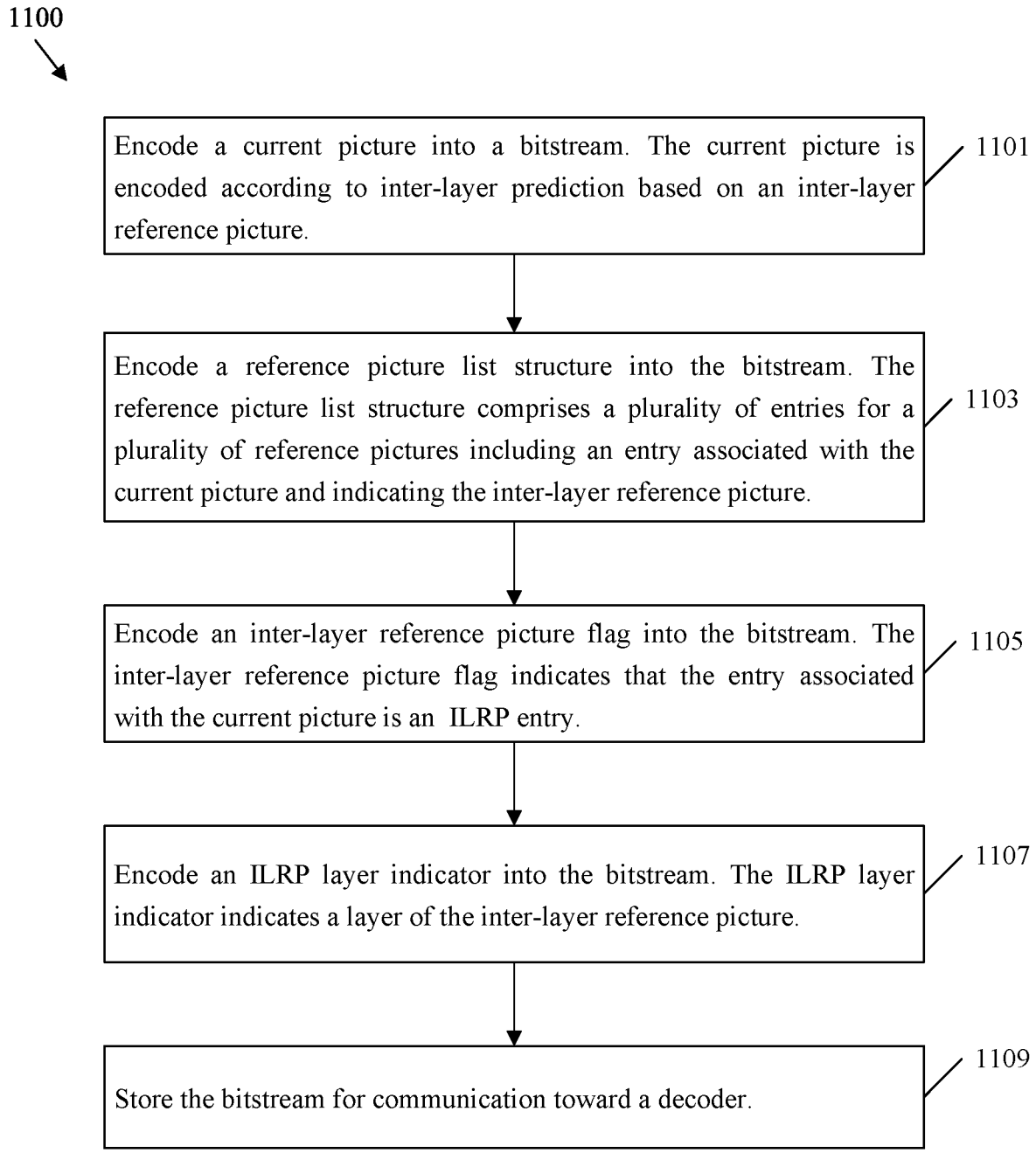
FIG. 11 is a flowchart of an example method of encoding a video sequence into a bitstream according to inter-layer prediction.

FIG. 11 is a flowchart of an example method 1100 of encoding a video sequence into a bitstream, such as bitstream 900, according to inter-layer prediction. Method 1100 can be employed by an encoder, such as a codec system 200, an encoder 300, and/or a video coding device 1000 when performing method 100 to encode a picture according to unidirectional inter-prediction 500, bidirectional inter-prediction 600, and/or layer based prediction 700 by employing a RPL structure 800.

Method 1100 may begin when an encoder receives a video sequence including a plurality of pictures and determines to encode that video sequence into a bitstream, for example based on user input. At step 1101, the encoder encodes a current picture into a bitstream. For example, the current picture may be encoded according to inter-layer prediction based on an inter-layer reference picture. For example, such inter-layer prediction may be performed according to inter-layer prediction 721. As described above, the inter-layer reference picture may be in the same AU as the current picture. Hence, the inter-layer reference picture may contain the same POC as the current picture. Further, the inter-layer reference picture is positioned in a different layer than the current picture. For example, the inter-layer reference picture may be associated with a lower layer than the layer of the current picture. Hence, the inter-layer reference picture may be associated with a lower layer ID than the layer ID of the current picture.

At step 1103, the encoder can encode a reference picture list structure, such as RPL structure 800, into the bitstream. The reference picture list structure comprises a plurality of entries for a plurality of reference pictures. Such entries include an entry associated with the current picture. The entry indicates the inter-layer reference picture. For example, the reference picture list structure may be denoted as ref_pic_list_struct(listIdx, rplsIdx) where listIdx identifies a reference picture list, rplsIdx identifies an entry in the reference picture list, and ref_pic_list_struct is a syntax structure that returns the entry based on listIdx and rplsIdx.

At step 1105, the encoder can encode an inter-layer reference picture flag into the bitstream. The inter-layer reference picture flag indicates that the entry associated with the current picture is an ILRP entry. For example, the inter-layer reference picture flag may be denoted as inter_layer_ref_pic_flag[listIdx][rplsIdx][i]. Specifically, the inter_layer_ref_pic_flag[listIdx][rplsIdx][i] may be set equal to one when an i-th entry in the ref_pic_list_struct (listIdx, rplsIdx) is an ILRP entry. Further, the inter_layer_ref_pic_flag[listIdx][rplsIdx][i] may be set equal to zero when the i-th entry in the ref_pic_list_struct(listIdx, rplsIdx) is not an ILRP entry. For example, the ref_pic_list_struct(listIdx, rplsIdx) and the inter_layer_ref_pic_flag [listIdx][rplsIdx][i] may be encoded into the bitstream in a SPS. In another example, the ref_pic_list_struct(listIdx, rplsIdx) and the inter_layer_ref_pic_flag[listIdx][rplsIdx][i] may be encoded into the bitstream in a header associated with the current picture, such as a slice header and/or a picture header.

At step 1107, the encoder can encode an ILRP layer indicator into the bitstream. The ILRP layer indicator indicates a layer of the inter-layer reference picture. For example, the ILRP layer indicator can indicate one or more layers for each entry of the reference picture list structure that is associated with an inter-layer reference picture as indicated by the inter-layer reference picture flag.

At step 1109, the encoder can store the bitstream for communication toward a decoder, for example for communication upon request.

Figure 12:
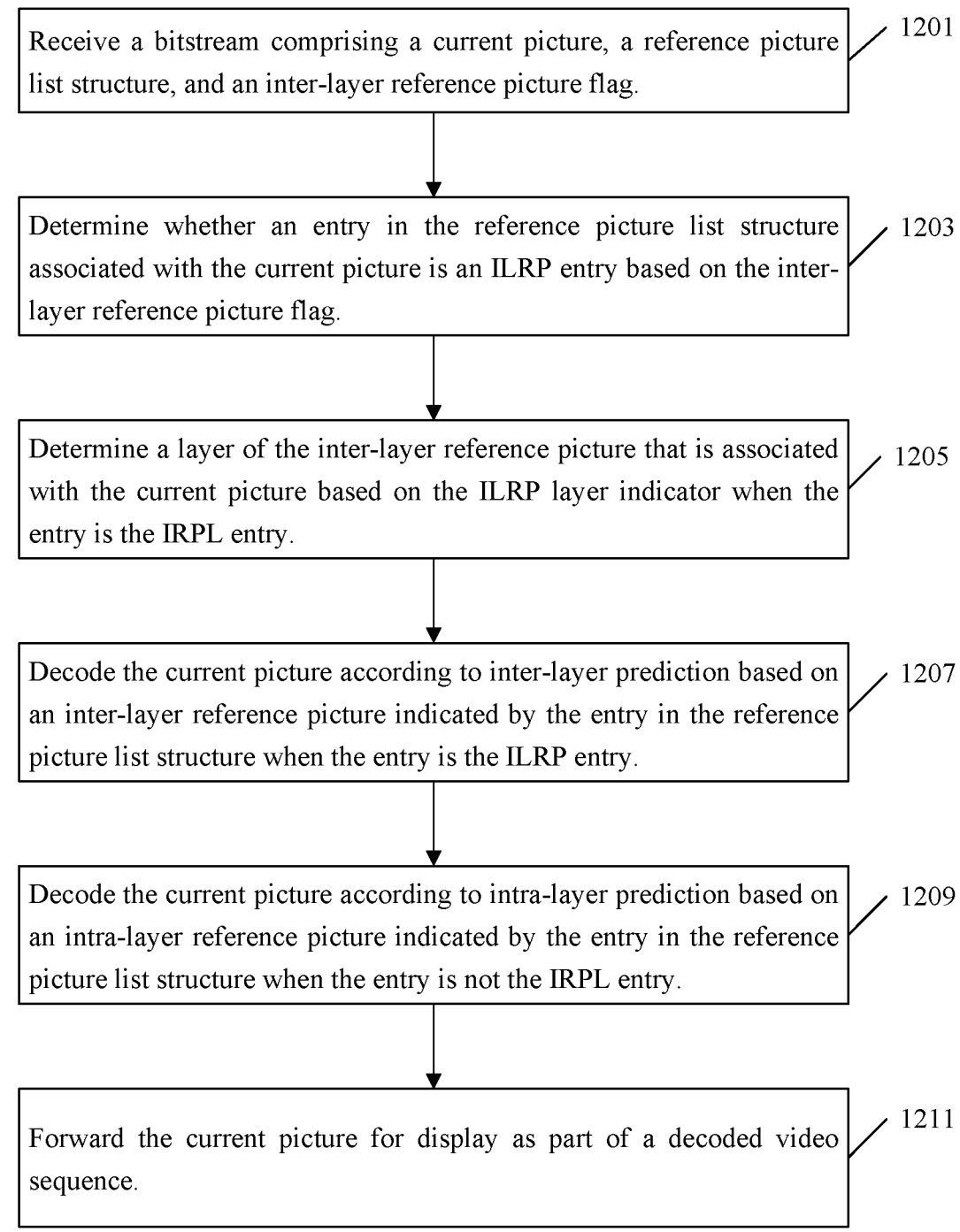
FIG. 12 is a flowchart of an example method of decoding a video sequence from a bitstream when employing inter-layer prediction.

FIG. 12 is a flowchart of an example method of decoding a video sequence from a bitstream, such as bitstream 900, when employing inter-layer prediction. Method 1200 can be employed by a decoder, such as a codec system 200, a decoder 400, and/or a video coding device 1000 when performing method 100 to decode a picture according to unidirectional inter-prediction 500, bidirectional inter-prediction 600, and/or layer based prediction 700 by employing a RPL structure 800.

Method 1200 may begin when a decoder begins receiving a bitstream of coded data representing a video sequence, for example as a result of method 1100. At step 1201, the decoder receives a bitstream. The bitstream may comprise a current picture, a reference picture list structure, an inter-layer reference picture flag, and/or an ILRP layer indicator. For example, the reference picture list structure may comprise the inter-layer reference picture flag and/or the ILRP layer indicator.

At step 1203, the decoder can determine an entry in the reference picture list structure associated with the current picture is an ILRP entry based on the inter-layer reference picture flag. For example, the reference picture list structure comprises a plurality of entries for a plurality of reference pictures. Such entries include an entry associated with the current picture. The entry indicates a reference picture. For example, the reference picture list structure may be denoted as ref_pic_list_struct(listIdx, rplsIdx) where listIdx identifies a reference picture list, rplsIdx identifies an entry in the reference picture list, and ref_pic_list_struct is a syntax structure that returns the entry based on listIdx and rplsIdx. Further, the inter-layer reference picture flag indicates whether the entry associated with the current picture is an ILRP entry. For example, the inter-layer reference picture flag may be denoted as inter_layer_ref_pic_flag[listIdx][rplsIdx][i]. Specifically, the inter_layer_ref_pic_flag[listIdx][rplsIdx][i] may be set equal to one when an i-th entry in the ref_pic_list_struct(listIdx, rplsIdx) is an ILRP entry. Further, the inter_layer_ref_pic_flag[listIdx][rplsIdx][i] may be set equal to zero when the i-th entry in the ref_pic_list_struct(listIdx, rplsIdx) is not an ILRP entry. For example, the ref_pic_list_struct(listIdx, rplsIdx) and the inter_layer_ref_pic_flag[listIdx][rplsIdx][i] may be encoded into the bitstream in a SPS. In another example, the ref_pic_list_struct(listIdx, rplsIdx) and the inter_layer_ref_pic_flag[listIdx][rplsIdx][i] may be encoded into the bitstream in a header associated with the current picture, such as a slice header and/or a picture header.

At step 1205, the decoder may determine a layer of the inter-layer reference picture based on the ILRP layer indicator when the entry is the ILRP entry. For example, the ILRP layer indicator can indicate one or more layers for each entry of the reference picture list structure that is associated with an inter-layer reference picture as indicated by the inter-layer reference picture flag. For example, the inter-layer reference picture may be included in the same AU as the current picture. Hence, the inter-layer reference picture may contain the same POC as the current picture. Further, the inter-layer reference picture is positioned in a different layer than the current picture. For example, the inter-layer reference picture may be associated with a lower layer than the layer of the current picture. Hence, the inter-layer reference picture may be associated with a lower layer ID than the layer ID of the current picture.

At step 1207, the decoder can decode the current picture according to inter-layer prediction based on an inter-layer reference picture indicated by the entry in the reference picture list structure at the level(s) indicated by the ILRP layer indicator when the entry is the ILRP entry.

At step 1209, the decoder can decode the current picture according to intra-layer prediction based on an intra-layer reference picture indicated by the entry in the reference picture list structure when the entry is not the ILRP entry. An intra-layer reference picture is simply referred to as a reference picture in a single layer context. Further, intra-layer prediction may include intra-prediction and/or single layer inter-prediction, depending on the context. When a reference picture is employed, intra-layer prediction indicates single layer inter-prediction.

At step 1211, the decoder forwards the decoded/reconstructed current picture for display as part of a decoded video sequence.

Figure 13:
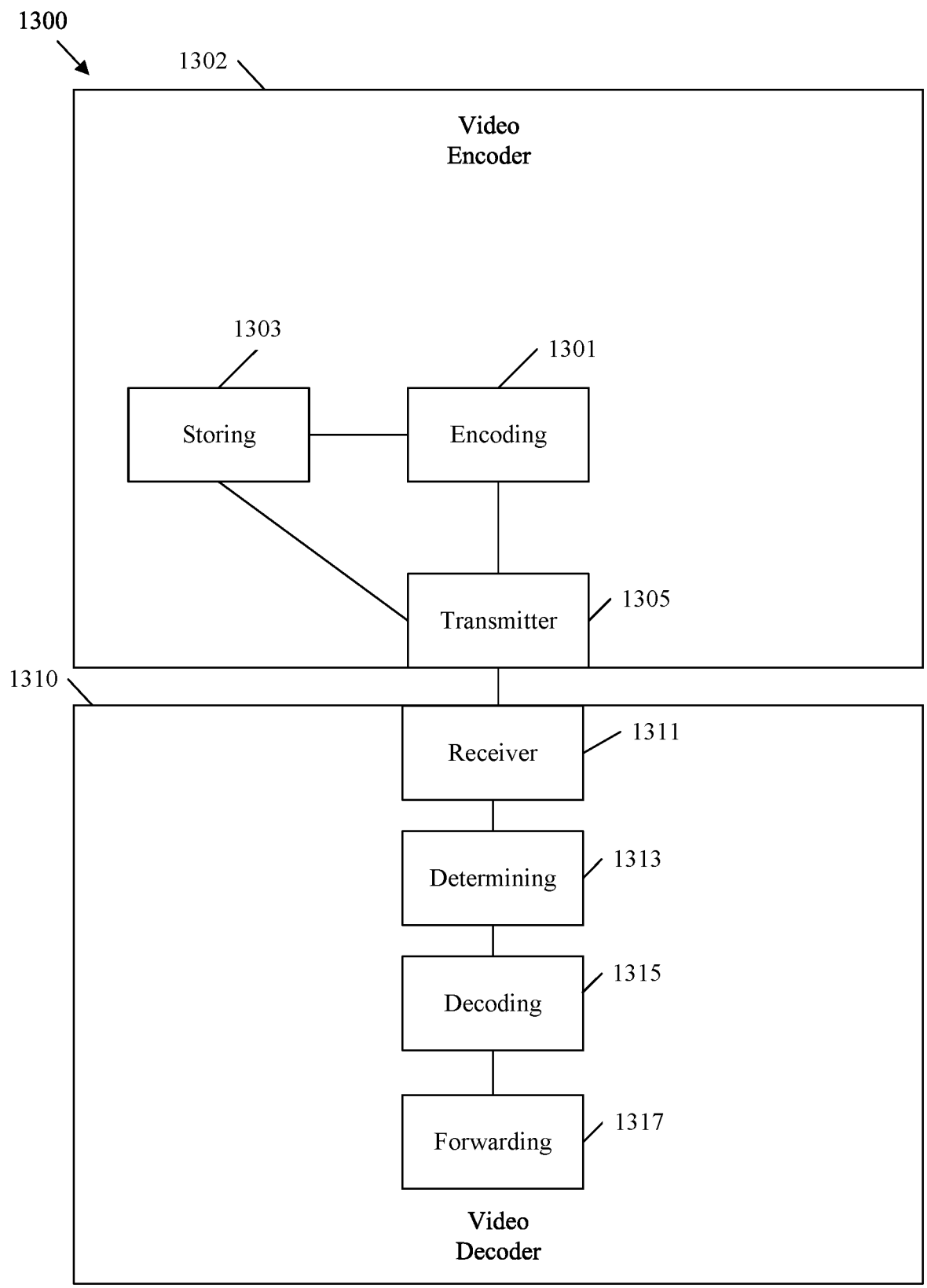
FIG. 13 is a schematic diagram of an example system for coding a video sequence of images in a bitstream when employing inter-layer prediction.

FIG. 13 is a schematic diagram of an example system 1300 for coding a video sequence of images in a bitstream, such as bitstream 900, when employing inter-layer prediction. System 1300 may be implemented by an encoder and a decoder such as a codec system 200, an encoder 300, a decoder 400, and/or a video coding device 1000. Further, system 1300 may be employed when implementing method 100, 1100, and/or 1200 to decode a picture according to unidirectional inter-prediction 500, bidirectional inter-prediction 600, and/or layer based prediction 700 by employing a RPL structure 800.

The system 1300 includes a video encoder 1302. The video encoder 1302 comprises an encoding module 1301 for encoding a current picture into a bitstream, the current picture encoded according to inter-layer prediction based on an inter-layer reference picture. The encoding module 1301 is further for encoding a reference picture list structure into the bitstream, the reference picture list structure comprising a plurality of entries for a plurality of reference pictures including an entry associated with the current picture and indicating the inter-layer reference picture. The encoding module 1301 is further for encoding an inter-layer reference picture flag into the bitstream, the inter-layer reference picture flag indicating that the entry associated with the current picture is an ILRP entry. The video encoder 1302 further comprises a storing module 1303 for storing the bitstream for communication toward a decoder. The video encoder 1302 further comprises a transmitting module 1305 for transmitting the bitstream toward video decoder 1310. The video encoder 1302 may be further configured to perform any of the steps of method 1100.

The system 1300 also includes a video decoder 1310. The video decoder 1310 comprises a receiving module 1311 for receiving a bitstream comprising a current picture, a reference picture list structure, and an inter-layer reference picture flag. The video decoder 1310 further comprises a determining module 1313 for determining whether an entry in the reference picture list structure associated with the current picture is an ILRP entry based on the inter-layer reference picture flag. The video decoder 1310 further comprises a decoding module 1315 for decoding the current picture according to inter-layer prediction based on an inter-layer reference picture indicated by the entry in the reference picture list structure when the entry is the ILRP entry. The video decoder 1310 further comprises a forwarding module 1317 for forwarding the current picture for display as part of a decoded video sequence. The video decoder 1310 may be further configured to perform any of the steps of method 1200.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

It should also be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A method implemented by a decoder, the method comprising:
   receiving a bitstream comprising a current picture and a reference picture list structure comprising an inter-layer reference picture flag, wherein the reference picture list structure is denoted as ref_pic_list_struct(listIdx, rplsIdx) where listIdx identifies a reference picture list, rplsIdx identifies an entry in the reference picture list, and ref_pic_list_struct is a syntax structure;
   determining an entry in the reference picture list structure associated with the current picture is an inter-layer reference picture (ILRP) entry based on the inter-layer reference picture flag; and
   decoding the current picture based on an inter-layer reference picture indicated by the entry in the reference picture list structure when the entry is the ILRP entry.

2. The method of claim 1, wherein the reference picture list structure further comprises an ILRP layer indicator, and wherein the method further comprises determining a layer of the inter-layer reference picture based on the ILRP layer indicator when the entry is the ILRP entry.

3. The method of claim 1, wherein the inter-layer reference picture flag is denoted as inter_layer_ref_pic_flag[listIdx][rplsIdx][i], wherein the inter_layer_ref_pic_flag[listIdx][rplsIdx][i] is equal to one when an i-th entry in the ref_pic_list_struct(listIdx, rplsIdx) is the ILRP entry, and wherein the inter_layer_ref_pic_flag[listIdx][rplsIdx][i] is equal to zero when the i-th entry in the ref_pic_list_struct (listIdx, rplsIdx) is not the ILRP entry.

4. The method of claim 3, wherein the ref_pic_list_struct (listIdx, rplsIdx) and the inter_layer_ref_pic_flag[listIdx][rplsIdx][i] are contained in the bitstream in a sequence parameter set (SPS).

5. The method of claim 1, further comprising decoding, by the decoder, the current picture according to intra-layer prediction based on an intra-layer reference picture indicated by the entry in the reference picture list structure when the entry is not the ILRP entry.

6. The method of claim 1, wherein the inter-layer reference picture is in a same access unit (AU) as the current picture, and wherein the inter-layer reference picture is associated with a lower layer identifier than the current picture.

7. A method implemented by an encoder, the method comprising:
   encoding a current picture into a bitstream, the current picture encoded according to inter-layer prediction based on an inter-layer reference picture;
   encoding a reference picture list structure into the bitstream, the reference picture list structure comprising a plurality of entries for a plurality of reference pictures including an entry associated with the current picture and indicating the inter-layer reference picture, wherein the reference picture list structure is denoted as ref_pic_list_struct(listIdx, rplsIdx) where listIdx identifies a reference picture list, rplsIdx identifies an entry in the reference picture list, and ref_pic_list_struct is a syntax structure;
   encoding an inter-layer reference picture flag into the bitstream, the inter-layer reference picture flag indicating that the entry associated with the current picture is an inter-layer reference picture (ILRP) entry; and
   storing the bitstream for communication toward a decoder.

8. The method of claim 7, further comprising encoding, by the encoder, an ILRP layer indicator into the bitstream, the ILRP layer indicator indicating a layer of the inter-layer reference picture.

9. The method of claim 7, wherein the inter-layer reference picture flag is denoted as inter_layer_ref_pic_flag [listIdx][rplsIdx][i], wherein the inter_layer_ref_pic_flag [listIdx][rplsIdx][i] is equal to one when an i-th entry in the ref_pic_list_struct(listIdx, rplsIdx) is the ILRP entry, and wherein the inter_layer_ref_pic_flag[listIdx][rplsIdx][i] is equal to zero when the i-th entry in the ref_pic_list_struct (listIdx, rplsIdx) is not the ILRP entry.

10. The method of claim 9, wherein the ref_pic_list_struct (listIdx, rplsIdx) and the inter_layer_ref_pic_flag[listIdx] [rplsIdx][i] are encoded into the bitstream in a sequence parameter set (SPS).

11. The method of claim 9, wherein the ref_pic_list_struct (listIdx, rplsIdx) and the inter_layer_ref_pic_flag[listIdx] [rplsIdx][i] are encoded into a header associated with the current picture.

12. The method of claim 7, wherein the inter-layer reference picture is in a same access unit (AU) as the current picture, and wherein the inter-layer reference picture is associated with a lower layer identifier than the current picture.

13. A decoder comprising:
   a receiver configured to receive a bitstream comprising a current picture and a reference picture list structure comprising an inter-layer reference picture flag, wherein the reference picture list structure is denoted as ref_pic_list_struct(listIdx, rplsIdx) where listIdx identifies a reference picture list, rplsIdx identifies an entry in the reference picture list, and ref_pic_list_struct is a syntax structure; and
   a processor configured to:
      determine an entry in the reference picture list structure associated with the current picture is an inter-layer reference picture (ILRP) entry based on the inter-layer reference picture flag; and decode the current picture based on an inter-layer reference picture indicated by the entry in the reference picture list structure when the entry is the ILRP entry.

14. The decoder of claim 13, wherein the reference picture list structure further comprises an ILRP layer indicator, and wherein the processor is further configured to determine a layer of the inter-layer reference picture based on the ILRP layer indicator when the entry is the ILRP entry.

15. The decoder of claim 13, wherein the inter-layer reference picture flag is denoted as inter_layer_ref_pic_flag [listIdx][rplsIdx][i], wherein the inter_layer_ref_pic_flag [listIdx][rplsIdx][i] is equal to one when an i-th entry in the ref_pic_list_struct(listIdx, rplsIdx) is the ILRP entry, and wherein the inter_layer_ref_pic_flag[listIdx][rplsIdx][i] is equal to zero when the i-th entry in the ref_pic_list_struct (listIdx, rplsIdx) is not the ILRP entry.

16. The decoder of claim 15, wherein the ref_pic_list_struct(listIdx, rplsIdx) and the inter_layer_ref_pic_flag[listIdx][rplsIdx][i] are contained in the bitstream in a sequence parameter set (SPS).

17. The decoder of claim 13, wherein the inter-layer reference picture is in a same access unit (AU) as the current picture, and wherein the inter-layer reference picture is associated with a lower layer identifier than the current picture.

* * * * *

UNITED STATES PATENT AND TRADEMARK OFFICE
CERTIFICATE OF CORRECTION

PATENT NO. : 12,003,700 B2
APPLICATION NO. : 17/536621
DATED : June 4, 2024
INVENTOR(S) : Ye-Kui Wang et al.

Page 1 of 1

It is certified that error appears in the above-identified patent and that said Letters Patent is hereby corrected as shown below:

On the Title Page

Item (71) Applicant:
Delete "Huawei Technologies Co., Ltd., Guangdong (CN)"
And insert -- Huawei Technologies Co., Ltd., Shenzhen (CN) --

Page 2, item (56) Other Publications, Second Column:
Delete "Document: JVET-P0334-v1, Wang, B., et al., "AHG17: On constant slice header parameter set in p." Joint Video Experts Team (JVET) of ITU-T SG 16 WP 3 and ISO/IEC JTC 1/SC 29/WG 11 16th Meeting: Geneva, CH, Oct. 1-11, 2019, 7 pages."
And insert -- Document: JVET-P0334-v1, Wang B., et al., "AHG17: On constant slice header parameter set in PPS," Joint Video Experts Team (JVET) of ITU-T SG 16 WP 3 and ISO/IEC JTC 1/SC 29/WG 11 16th Meeting: Geneva, CH, Oct. 1-11, 2019, 7 pages. --

Signed and Sealed this
Ninth Day of July, 2024

Katherine Kelly Vidal
*Director of the United States Patent and Trademark Office*